(12) United States Patent
Kim et al.

(10) Patent No.: US 7,719,641 B2
(45) Date of Patent: May 18, 2010

(54) ARRAY SUBSTRATE, METHOD OF MANUFACTURING THE SAME AND LIQUID CRYSTAL DISPLAY APPARATUS HAVING THE SAME

(75) Inventors: Jae-Hyun Kim, Seoul (KR); Sung-Eun Cha, Geoje-si (KR); Sang-Woo Kim, Suwon-si (KR); Won-Sang Park, Yongin-si (KR); Jae-Young Lee, Seoul (KR); Jae-Ik Lim, Chuncheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/415,598

(22) Filed: Mar. 31, 2009

(65) Prior Publication Data

US 2009/0186436 A1    Jul. 23, 2009

Related U.S. Application Data

(63) Continuation of application No. 11/004,152, filed on Dec. 3, 2004, now Pat. No. 7,511,788.

(30) Foreign Application Priority Data

Dec. 12, 2003  (KR) ............... 2003-90602
Jan. 8, 2004   (KR) ............... 2004-1323

(51) Int. Cl.
*G02F 1/1335* (2006.01)

(52) U.S. Cl. .............. 349/114; 349/129; 349/138; 349/43; 349/187

(58) Field of Classification Search .......... 349/114, 349/129, 138, 43, 187
See application file for complete search history.

(56) References Cited

U.S. PATENT DOCUMENTS

| 2002/0039161 A1* | 4/2002 | Kim ............... 349/129 |
| 2003/0081159 A1* | 5/2003 | Ha et al. .......... 349/113 |
| 2003/0133055 A1* | 7/2003 | Um et al. .......... 349/43 |
| 2003/0160928 A1* | 8/2003 | Ozawa et al. ...... 349/129 |

* cited by examiner

*Primary Examiner*—Thoi V Duong
(74) *Attorney, Agent, or Firm*—Innovation Counsel LLP

(57) ABSTRACT

An array substrate includes a plate, a switching element, an insulating layer and a pixel electrode. The plate includes a pixel region, and the switching element is disposed on the plate. The insulating layer is disposed on the plate to include an opening for a multi-domain disposed in the pixel region and a contact hole. An electrode of the switching element is partially exposed through the contact hole. The pixel electrode is disposed on the insulating layer corresponding to the pixel region, an inner surface of the opening for the multi-domain and an inner surface of the contact hole so that the pixel electrode is electrically connected to the electrode of the switching element. Therefore, the viewing angle and the image display quality of the LCD apparatus are improved, and a manufacturing process is simplified.

10 Claims, 29 Drawing Sheets

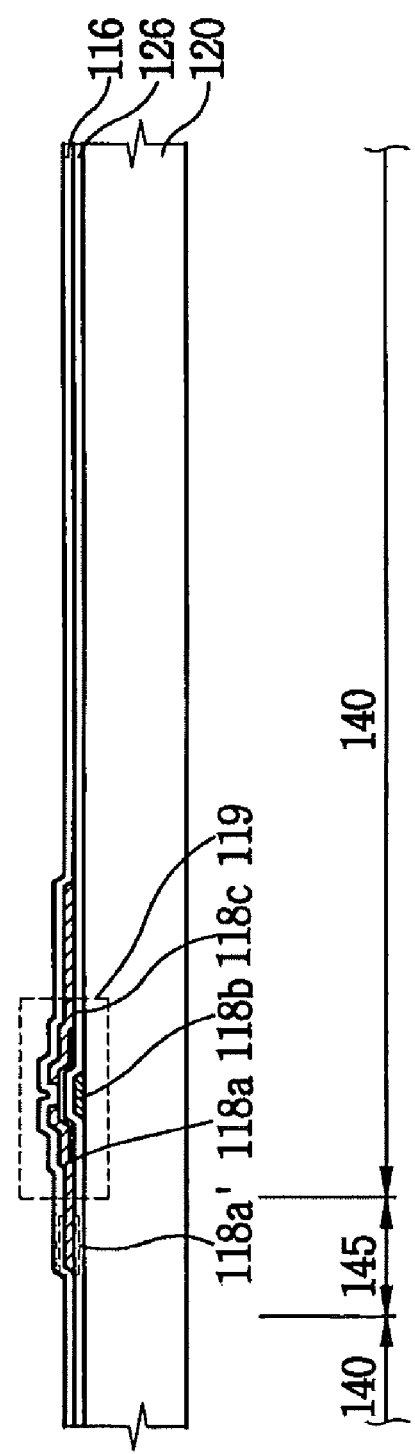

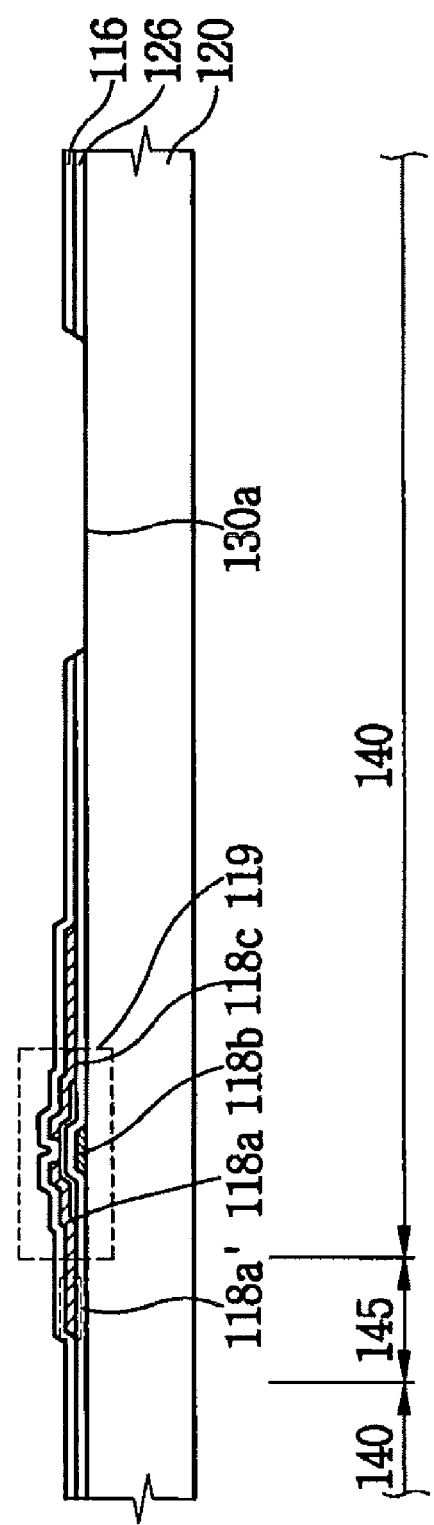

ARRAY SUBSTRATE, METHOD OF MANUFACTURING THE SAME AND LIQUID CRYSTAL DISPLAY APPARATUS HAVING THE SAME

CROSS REFERENCE

This patent application is a Continuation Application of U.S. application Ser. No. 11/004,152, filed Dec. 3, 2004, now U.S. Pat. No. 7,511,788, issued on Mar. 31, 2009, which claims priority to and the benefit of Korean Patent Application No. 2003-90602, filed on Dec. 12, 2003 and Korean Patent Application No. 2004-1323, filed on Jan. 8, 2004, the contents of which are hereby incorporated by reference herein in their entirety.

BACKGROUND

1. Field of the Invention

The present invention relates to an array substrate, a method of manufacturing the array substrate and a liquid crystal display (LCD) apparatus having the array substrate. More particularly, the present invention relates to an array substrate capable of improving viewing angle and simplifying manufacturing process, a method of manufacturing the array substrate and an LCD apparatus having the array substrate.

2. Description of the Related Art

In general, a liquid crystal in an LCD apparatus varies an arrangement in response to an electric field applied thereto, and thus a light transmittance thereof may be altered. The liquid crystal is interposed between an array substrate having a thin film transistor (TFT) and a color filter substrate, and has an anisotropic dielectric constant.

The liquid crystal of the LCD apparatus is anisotropic so that an image display quality is dependent on the angle of a viewpoint. In a conventional LCD apparatus, the range of the viewpoint angle is restricted so that the image display quality is deteriorated. When the LCD apparatus is used as a monitor, the viewpoint angle may be more than 90°. The viewpoint angle having a contrast ratio of more than about 10:1 is defined as a viewing angle of the LCD apparatus. The contrast ratio is a ratio of a luminance of a dark image to a luminance of a bright image. When the LCD apparatus displays a darker image, and has more uniform luminance, the contrast ratio of the LCD apparatus increases.

The LCD apparatus may include a black matrix having a decreased reflectivity and use a normally black mode so as to prevent the leakage of a light and to display the darker image. When a voltage is not applied to a common electrode and a pixel electrode of the LCD apparatus having the normally black mode, a black image is displayed. In order to uniformize the luminance, the LCD apparatus includes a compensation film or a liquid crystal layer having a multi-domain. The liquid crystal layer having the multi-domain has a plurality of domains.

The LCD apparatus forming the multi-domain includes a mixed vertical alignment (MVA) mode, a patterned vertical alignment (PVA) mode, an in-plane switching (IPS) mode, etc.

When the LCD apparatus includes the MVA mode, a plurality of protrusions is formed on the color filter substrate and/or a thin film transistor (TFT) substrate to form the multi-domain, thereby increasing the viewing angle of the LCD apparatus. The protrusions are formed on the color filter substrate and/or the TFT substrate through additional processes, for example, such as coating process, photo process, etc., thereby increasing the manufacturing cost of the LCD apparatus. In addition, when the color filter substrate is misaligned with the TFT substrate, the protrusions may not form the multi-domain so that the yield of the LCD apparatus is decreased.

When the LCD apparatus includes the PVA mode, a plurality of slits is formed in the common electrode to distort the electric field in the liquid crystal layer to form the multi-domain, thereby increasing the viewing angle of the LCD apparatus. When the color filter substrate is misaligned with the TFT substrate, the slits may form a distorted multi-domain, thereby deteriorating the image display quality.

When the LCD apparatus includes the IPS mode, the TFT substrate includes a plurality of electrodes disposed substantially parallel with one another to form the distorted electric field. The LCD apparatus including the IPS mode, however, has decreased luminance.

In addition, the LCD apparatus forming the multi-domain is manufactured through the additional processes so that the manufacturing cost of the LCD apparatus is increased.

SUMMARY

The present invention provides an array substrate capable of improving viewing angle and simplifying manufacturing process.

The present invention also provides a method of manufacturing the above-mentioned array substrate.

The present invention also provides an LCD apparatus having the above-mentioned array substrate.

An array substrate in accordance with an aspect of the present invention includes a plate, a switching element, an insulating layer and a pixel electrode.

The plate includes a pixel region. The switching element is disposed on the plate. The insulating layer is disposed on the plate to include an opening for a multi-domain disposed in the pixel region and a contact hole. An electrode of the switching element is partially exposed through the contact hole. The pixel electrode is disposed on the insulating layer corresponding to the pixel region, an inner surface of the opening for the multi-domain and an inner surface of the contact hole so that the pixel electrode is electrically connected to the electrode of the switching element.

An array substrate in accordance with another aspect of the present invention includes a plate, an insulating layer and a pixel electrode.

The plate includes a pixel region having a transmission window and a switching element disposed in the pixel region. A light passes through the transmission window. The insulating layer is disposed on the plate to include a plurality of openings for a multi-domain disposed in the pixel region and a contact hole. An electrode of the switching element is partially exposed through the contact hole. The pixel electrode is disposed on the insulating layer corresponding to the pixel region, an inner surface of the openings for the multi-domain and an inner surface of the contact hole so that the pixel electrode is electrically connected to the electrode of the switching element.

A method of manufacturing the array substrate in accordance with an aspect of the present invention is provided as follows.

A switching element is formed on a plate including a pixel region. An insulating layer is formed on the plate. The insulating layer includes an opening for a multi-domain disposed in the pixel region and a contact hole. An electrode of the switching element is partially exposed through the contact hole. A pixel electrode is formed on the insulating layer, an inner surface of the opening for the multi-domain and an inner surface of the contact hole. The pixel electrode is electrically connected to the electrode of the switching element.

A method of manufacturing the array substrate in accordance with another aspect of the present invention is provided as follows.

An insulating layer is formed on a plate including a pixel region having a transmission window, and includes a plurality of openings for a multi-domain disposed in the transmission window and a contact hole. A light passes through the transmission window, and an electrode of the switching element is partially exposed through the contact hole. A pixel electrode is formed on the insulating layer, an inner surface of the openings for the multi-domain and an inner surface of the contact hole. The pixel electrode is electrically connected to the electrode of the switching element.

A method of manufacturing the array substrate in accordance with still another aspect of the present invention is provided as follows.

A gate electrode is formed on a plate including a pixel region having a transmission window. A light passes through the transmission window. A gate insulating layer is formed on the plate having the gate electrode. A switching element is formed on the gate insulating layer. The switching element includes a semiconductor layer pattern, a source electrode and a drain electrode. A transparent insulating material is disposed over the substrate having the switching element. The deposited transparent insulating material and the gate insulating layer are etched to form a plurality of openings for a multi-domain that is disposed in the transmission window and a contact hole. The drain electrode is partially exposed through the contact hole. A transparent electrode is formed on the organic layer corresponding to the pixel region, an inner surface of the openings for the multi-domain and an inner surface of the contact hole. A reflection electrode is formed in a reflection region of the pixel region. An externally provided light is reflected from the reflection electrode.

A display apparatus in accordance with an aspect of the present invention includes a first substrate, a second substrate and a liquid crystal layer.

The second substrate includes a plate having a pixel region, a switching element disposed on the plate, an insulating layer and a pixel electrode. The pixel electrode is disposed on the insulating layer corresponding to the pixel region, an inner surface of the opening for the multi-domain and an inner surface of the contact hole so that the pixel electrode is electrically connected to the electrode of the switching element. The insulating layer is disposed on the plate, and includes an opening for a multi-domain and a contact hole. The opening for a multi-domain is disposed in the pixel region and a contact hole. An electrode of the switching element is partially exposed through the contact hole. The second substrate corresponds to the first substrate. The liquid crystal layer is interposed between the first and second substrates.

A display apparatus in accordance with another aspect of the present invention includes a first substrate, a second substrate and a liquid crystal layer.

The second substrate includes a plate including a pixel region having a transmission window and a switching element disposed in the pixel region, an insulating layer, and a pixel electrode. The insulating layer is disposed on the plate, and includes a plurality of openings for a multi-domain disposed in the pixel region and a contact hole. An electrode of the switching element is partially exposed through the contact hole. A light passes through the transmission window. The pixel electrode is disposed on the insulating layer corresponding to the pixel region, an inner surface of the openings for the multi-domain and an inner surface of the contact hole so that the pixel electrode is electrically connected to the electrode of the switching element. The second substrate corresponds to the first substrate. The liquid crystal layer is interposed between the first and second substrates.

The LCD apparatus includes a reflective type LCD apparatus, a transmissive type LCD apparatus, a reflective-transmissive type LCD apparatus, etc.

The switching element includes a thin film transistor (TFT), a field effect transistor (FET), etc.

Therefore, the insulating layer includes the openings for the multi-domain so that the viewing angle and the image display quality of the LCD apparatus are improved.

In addition, the openings for the multi-domain are disposed on the second substrate so that the LCD apparatus includes the multi-domain having improved characteristics, although the first substrate is misaligned with the second substrate.

Furthermore, the openings for the multi-domain are formed from a same layer as the contact hole so that the manufacturing process is simplified and the manufacturing cost is decreased.

BRIEF DESCRIPTION OF THE DRAWINGS

The above and other advantages of the present invention will become more apparent by describing in detail exemplary embodiments thereof with reference to the accompanying drawings, in which:

FIGS. 5A to 5H are cross-sectional views illustrating a method of manufacturing an LCD apparatus according to an exemplary embodiment of the present invention;

DETAILED DESCRIPTION OF THE EMBODIMENT(S)

It should be understood that the exemplary embodiments of the present invention described below may be varied in many different ways without departing from the inventive principles disclosed herein, and the scope of the present invention is therefore not limited to these particular following embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

Figure 1:
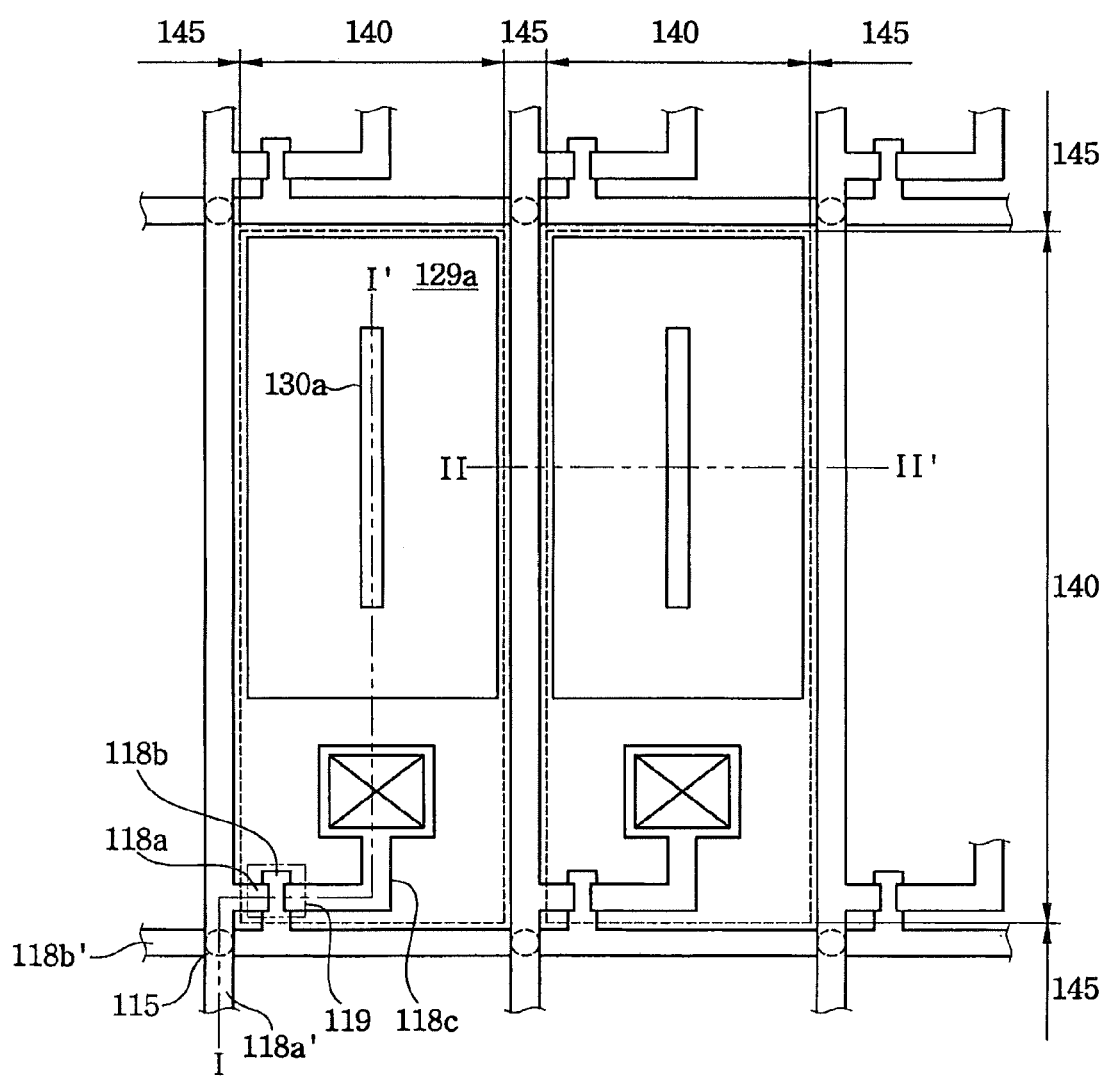
FIG. 1 is a plan view illustrating an LCD apparatus according to an exemplary embodiment of the present invention.
Figure 2:
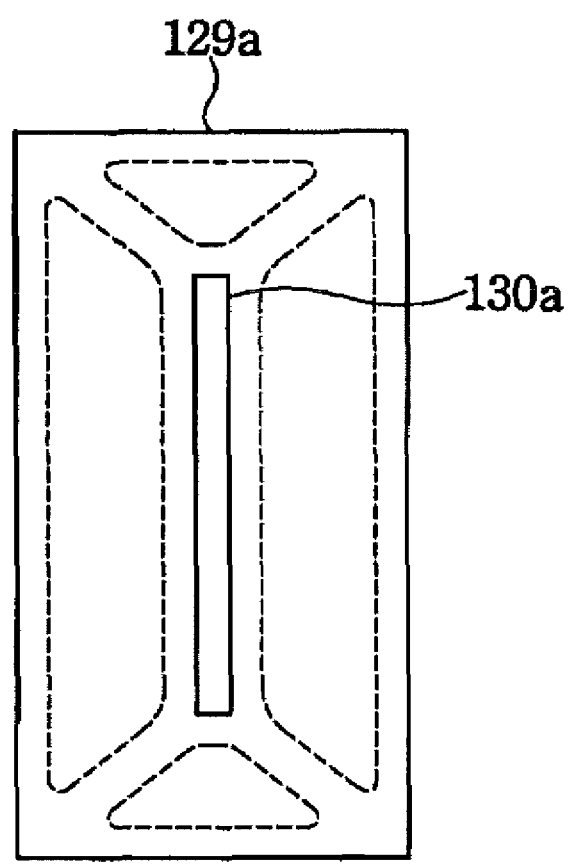
FIG. 2 is a plan view illustrating a multi-domain formed in a transmission window shown in FIG. 1.
Figure 3:
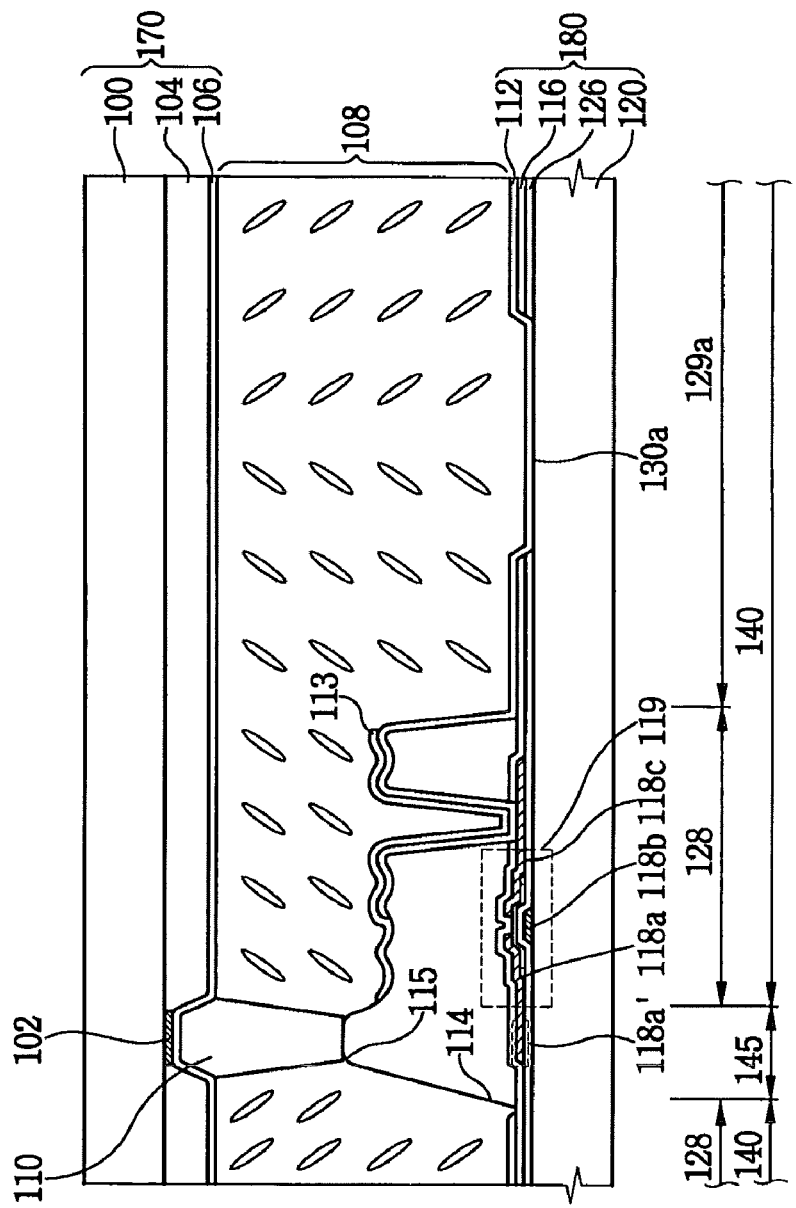
FIG. 3 is a cross-sectional view taken along the I-I' line shown in FIG. 1.
Figure 4:
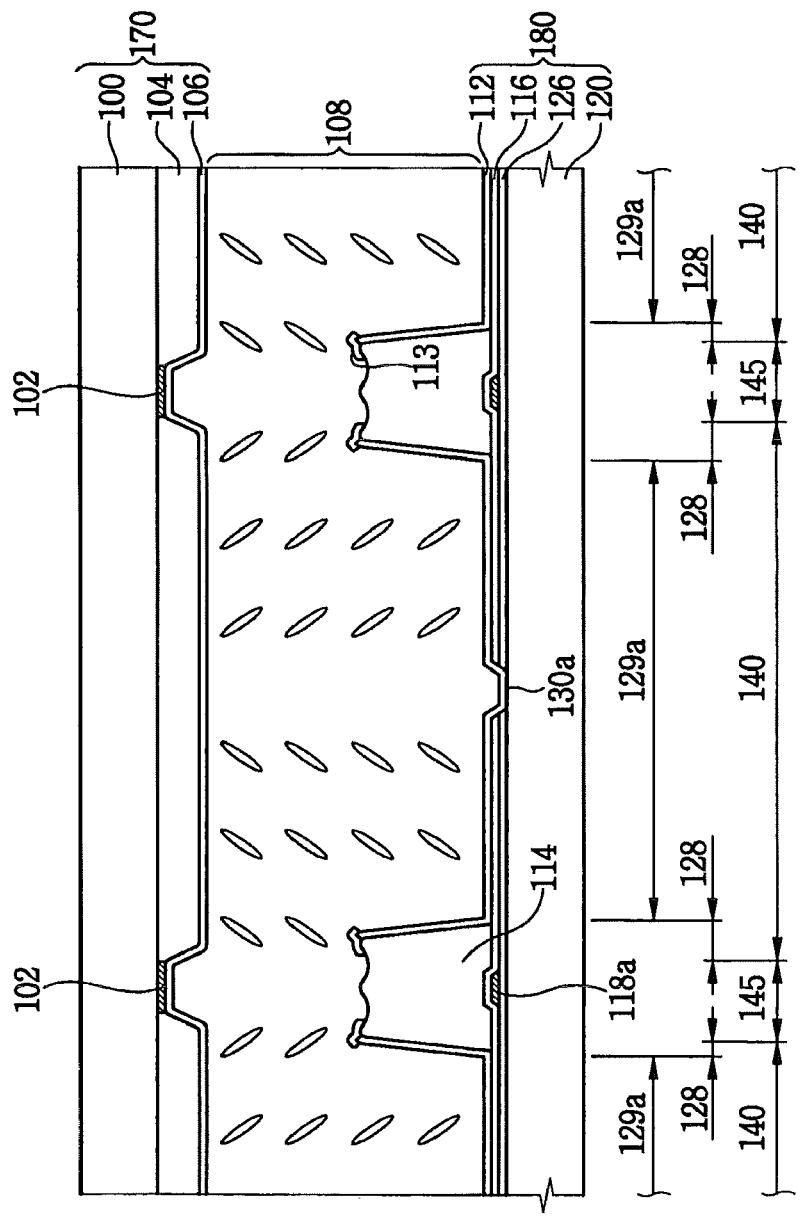
FIG. 4 is a cross-sectional view taken along the II-II' line shown in FIG. 1.

FIG. 1 is a plan view illustrating an LCD apparatus according to an exemplary embodiment of the present invention. FIG. 2 is a plan view illustrating a multi-domain formed in a transmission window shown in FIG. 1. FIG. 3 is a cross-sectional view taken along the I-I' line shown in FIG. 1. FIG. 4 is a cross-sectional view taken along the Ii-II' line shown in FIG. 1.

Referring to FIGS. 1 to 4, the LCD apparatus includes a first substrate 170, a second substrate 180 and a liquid crystal layer 108.

The first substrate 170 includes an upper plate 100, a black matrix 102, a color filter 104, a common electrode 106 and a spacer 110. The second substrate 180 includes a lower plate 120, a thin film transistor (TFT) 119, a source line 118a', a gate line 118b', a gate insulating layer 126, a passivation layer 116, a transparent electrode 112 and a reflection electrode 113. The liquid crystal layer 108 is interposed between the first and second substrates 170 and 180.

The second substrate 180 includes a pixel region 140 and a blocking region 145. An image is displayed in the pixel region 140, and a light is blocked in the blocking region 145. The pixel region 140 includes a transmission window 129a and a reflection region 128. A light generated from a backlight assembly passes through the transmission window 129, and a light that is externally provided to the LCD apparatus is reflected from the reflection region 128. For example, the transmission window 129a may have a rectangular shape.

The upper and lower plates 100 and 120 include a transparent glass. The light may pass through the transparent glass. The upper and lower plates 100 and 120 do not include alkaline ions. When the upper and lower plates 100 and 120 include the alkaline ions, the alkaline ions may be dissolved in the liquid crystal layer 108 to decrease the resistivity of the liquid crystal layer 108, thereby decreasing the image display quality and the adhesive strength between a sealant and the plates 100 and 120. In addition, the characteristics of the TFT 119 may be deteriorated.

Alternatively, the upper and lower substrates 100 and 120 may also include triacetylcellulose (TAC), polycarbonate (PC), polyethersulfone (PES), polyethyleneterephthalate (PET), polyethylenenaphthalate (PEN), polyvinylalcohol (PVA), polymethylmethacrylate (PMMA), cyclo-olefin polymer (COP), etc.

The upper and lower substrates 100 and 120 are optically isotropic. Alternatively, the upper and lower substrates 100 and 120 may be optically an isotropic.

The black matrix 102 is disposed in the reflection region 128 of the upper plate 100 to block the internally and externally provided lights. The black matrix 102 blocks the light passing through the blocking region 145 to improve the image display quality.

A metallic material or an opaque organic material is deposited on the upper plate 120 and etched to form the black matrix 102. The metallic material of the black matrix 102 includes chrome (Cr), chrome oxide (CrOx), chrome nitride (CrNx), etc. The opaque organic material includes carbon black, a pigment compound, a colorant compound, etc. The pigment compound may include a red pigment, a green pigment and a blue pigment, and the colorant compound may include a red colorant, a green colorant and a blue colorant. Alternatively, the opaque organic material comprising photoresist may be coated on the upper plate 100 to form the black matrix 102 through a photo process. The edges of a plurality of the color filters may also be overlapped one another to form the black matrix 102.

The color filter 104 is formed on the upper plate 100 having the black matrix 102 so that the internally and externally provided lights having a predetermined wavelength may pass through the color filter 104. The color filter 104 includes a photo initiator, a monomer, a binder, a pigment, a dispersant, a solvent, a photoresist, etc. The color filter 104 may be disposed on the lower plate 120 or the passivation layer 116.

The common electrode 106 is formed on the upper plate 100 having the black matrix 102 and the color filter 104. The common electrode 106 includes a transparent conductive material, for example, such as indium tin oxide (ITO), indium zinc oxide (IZO), zinc oxide (ZO), etc. Alternatively, the common electrode 106 may be disposed in substantially parallel with the transparent electrode 112 and the reflection electrode 113.

The spacer 110 is formed on the upper plate 100 having the black matrix 102, the color filter 104 and the common electrode 106. The first substrate 170 is spaced apart from the second substrate 180 by the spacer 110. In this exemplary embodiment, the spacer 110 is disposed at a position corresponding to the black matrix 102, and includes a column shape. Alternatively, the spacer 110 may include a ball shaped spacer or a mixture of the column shaped spacer and the ball shaped spacer.

The TFT 119 is disposed in the reflection region 128 of the lower plate 120, and includes a source electrode 118a, a gate electrode 118b, a drain electrode 118c and a semiconductor layer pattern. A driving integrated circuit (not shown) applies the source electrode 118a with a data voltage through the source line 118a', and applies the gate electrode 118b with a gate signal through the gate line 118b'.

A storage capacitor (not shown) is formed on the lower plate 120 to maintain a voltage difference between the reflection electrode 113 and the common electrode 106 and a voltage difference between the transparent electrode 112 and the common electrode 106. The storage capacitor (not shown) may have an end-gate type or an isolated line type.

The gate insulating layer 126 is formed over the lower plate 120 having the gate electrode 118b so that the gate electrode 118b is electrically insulated from the source electrode 118a and the drain electrode 118c. The gate insulating layer 126 may include silicon oxide (SiOx), silicon nitride (SiNx), etc.

The passivation layer 116 is disposed over the lower plate 120 having the TFT 119. The passivation layer 116 includes a contact hole. The drain electrode 118c is partially exposed through the contact hole. The passivation layer 126 may include the silicon oxide (SiOx), the silicon nitride (SiNx), etc.

The passivation layer 116 includes an opening 130a for a multi-domain to form the multi-domain in the liquid crystal layer 108. The opening 130a for the multi-domain is disposed in the transmission window 129a. In this exemplary embodiment, the opening 130a for the multi-domain is disposed on the central line of the transmission window 129a, and has an extended rectangular shape. The gate insulating layer 126 corresponding to the opening 130a for the multi-domain is also opened.

The organic layer 114 is disposed on the lower plate 120 having the TFT 119 and the passivation layer 126 so that the TFT 119 is electrically insulated from the transparent electrode 112 and the reflection electrode 113. The organic layer 114 includes a contact hole. The organic layer 114 defines the transmission window 129a. The transmission window 129a is opened, and a portion of the drain electrode 118c is exposed through the contact hole.

The organic layer 114 adjusts the thickness of the liquid crystal layer 108 so that the liquid crystal layer 108 has a first thickness corresponding to the reflection region 128 and a second thickness corresponding to the transmission window 129a. The second thickness is different from the first thickness corresponding to the reflection region 128.

The organic layer 114 also planarizes the lower plate 120 having the TFT 119, the source line 118a', the gate line 118b', etc.

In this exemplary embodiment, the organic layer 114 includes convex and concave disposed on the upper surface of the organic layer 114. The convex and concave improve the reflectivity of the reflection electrode 113. A protruded portion 115 is disposed on a portion of the organic layer 114 where the source line 118a' is overlapped with the gate line 118b'. The protruded portion 115 corresponds to the spacer 110, thereby controlling the arrangement of a vertically aligned liquid crystal of the liquid crystal layer 108. In this exemplary embodiment, the protruded portion 115 makes contact with the spacer 110. Therefore, the multi domain is formed in the liquid crystal layer 108.

Referring again to FIG. 2, four domains are disposed in the transmission window 129a. The multi-domain includes the four domains, and a center of the multi-domain corresponds to the opening 130a for the multi-domain. The four domains are disposed adjacent to the opening 130a for the multi-domain.

The transparent electrode 112 is formed on the organic layer 114 corresponding to the pixel region 140, in the contact hole and in the transmission window 129a so that the transparent electrode 112 is electrically connected to the drain electrode 118c. When the voltages are applied to the common electrode 106 and the transparent electrode 112, the liquid crystal of the liquid crystal layer 108 is controlled so that the light transmittance of the liquid crystal layer 108 is changed. The transparent electrode 112 includes indium tin oxide (ITO), indium zinc oxide (IZO), zinc oxide (ZO), etc.

The reflection electrode 113 is disposed on the organic layer 114 corresponding to the reflection region 128. In this exemplary embodiment, the reflection electrode 113 is disposed along the convex and concave of the organic layer 114 so that the externally provided light is reflected from the reflection electrode 113 into a predetermined direction. The reflection electrode 113 includes a conductive material so that the reflection electrode 113 is electrically connected to the drain electrode 118c through the transparent electrode 112.

A first alignment layer (not shown) and a second alignment layer (not shown) may be disposed on the first and second substrates 170 and 180, respectively, to align the liquid crystal layer 108. The first and second alignment layers (not shown) may be rubbed in predetermined directions. In this exemplary embodiment, the rubbing direction of the first alignment layer (not shown) of the first substrate 170 is opposite to that of the second alignment layer (not shown) of the second substrate 180.

The liquid crystal layer 108 is interposed between the first and second substrates 170 and 180, and sealed by the sealant (not shown). The liquid crystal layer 108 may include a vertical alignment (VA) mode, a twisted nematic (TN) mode, a mixed twisted nematic (MTN) mode or a homogeneous alignment mode. In this exemplary embodiment, the liquid crystal layer 108 includes the vertical alignment (VA) mode.

When the voltages are applied to the transparent electrode 112, the reflection electrode 113 and the common electrode 106, a distorted electric field is formed in a region adjacent to the protruded portion 115 and the spacer 110, a stepped portion between the transmission window 129a and the reflection region 128, and a region adjacent to each of the openings 130a for the multi-domain. When the distorted electric field is applied to the vertically aligned liquid crystal layer 108, the multi-domain is formed in the vertically aligned liquid crystal layer 108 so that the viewing angle of the LCD apparatus is improved.

FIGS. 5A to 5H are cross-sectional views illustrating a method of manufacturing an LCD apparatus according to an exemplary embodiment of the present invention.

Figure 5A:
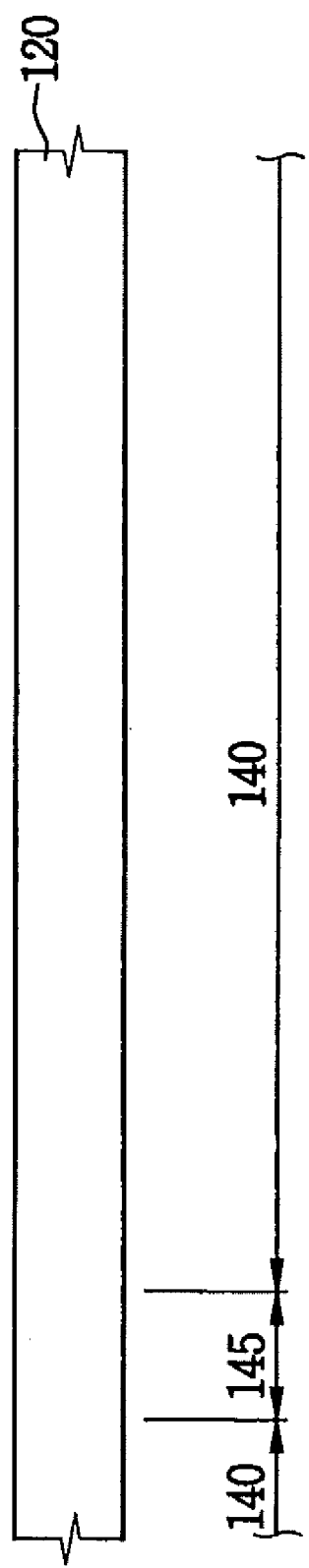

Referring to FIG. 5A, the lower plate 120 includes the pixel region 140 and the blocking region 145. The pixel region 140 includes the transmission window 129a and the reflection region 128. The internally provided light generated from the backlight assembly (not shown) passes through the transmission window 129a, and the externally provided light is reflected from the reflection region 128.

Referring to FIG. 5B, a conductive material is deposited on the lower plate 120. The deposited conductive material is partially removed to form the gate electrode 118b and the gate line 118b'. The gate insulating layer 126 is deposited on the lower plate 120 having the gate electrode 118b and the gate line 118b'. The gate insulating layer 126 includes a transparent conductive material. In this exemplary embodiment, the gate insulating layer 126 includes silicon oxide (SiOx), silicon nitride (SiNx), etc.

Amorphous silicon and N+ type amorphous silicon are deposited on the gate insulating layer 126 and etched to form the semiconductor layer on the gate insulating layer 126 corresponding to the gate electrode 118b. A conductive material is deposited on the gate insulating layer 126 having the semiconductor layer. The conductive material deposited on the gate insulating layer 126 is partially etched to form the source electrode 118a, the source line 118a' and the drain electrode 118c. Therefore, the TFT 119 including the source electrode 118a, the gate electrode 118b, the drain electrode 118c and the semiconductor layer is formed on the lower plate 120.

A transparent insulating material is deposited over the lower plate 120 having the TFT 119. In this exemplary embodiment, the transparent insulating material includes the silicon oxide (SiOx), the silicon nitride (SiNx), etc.

Referring to FIG. 5C, the deposited transparent material and the gate insulating layer 126 are partially removed to form the contact hole and the opening 130a for the multi-domain disposed on the central line of the transmission window 129a. The drain electrode 118c is partially exposed through the contact hole. Therefore, the passivation layer 116 including the contact hole and the opening 130a for the multi-domain is formed on the lower plate 120 having the TFT 119.

Figure 5D:
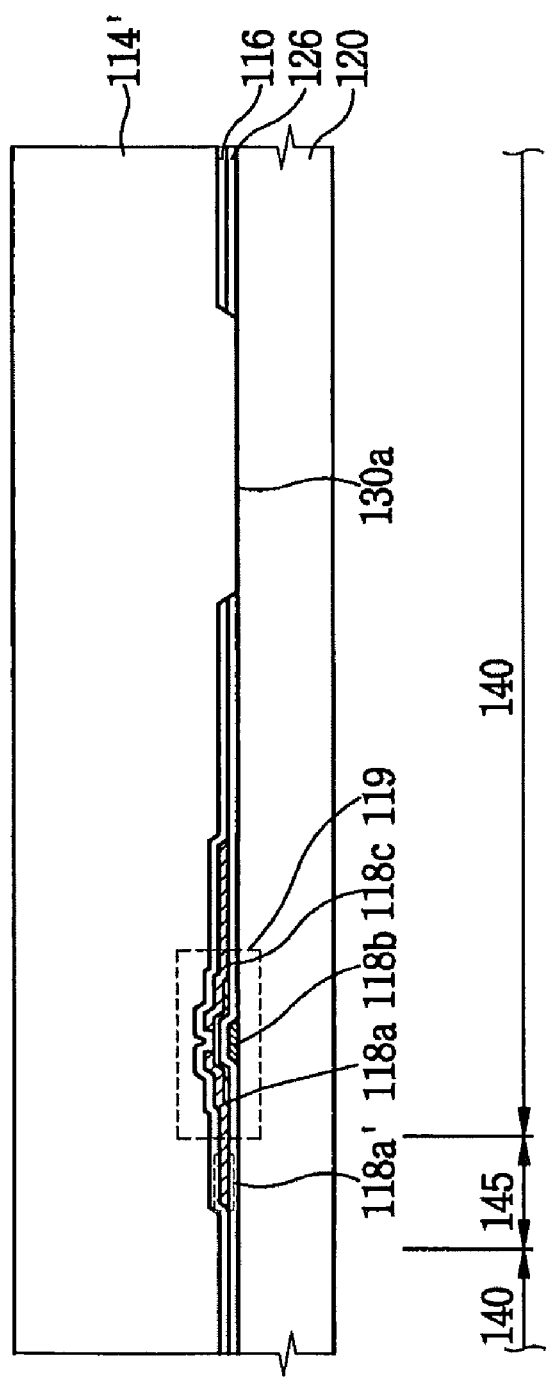

Referring to FIG. 5D, an organic material is coated over the passivation layer 116 having the contact hole and the opening 130a for the multi-domain. In this exemplary embodiment, the organic material includes photoresist.

Figure 5E:
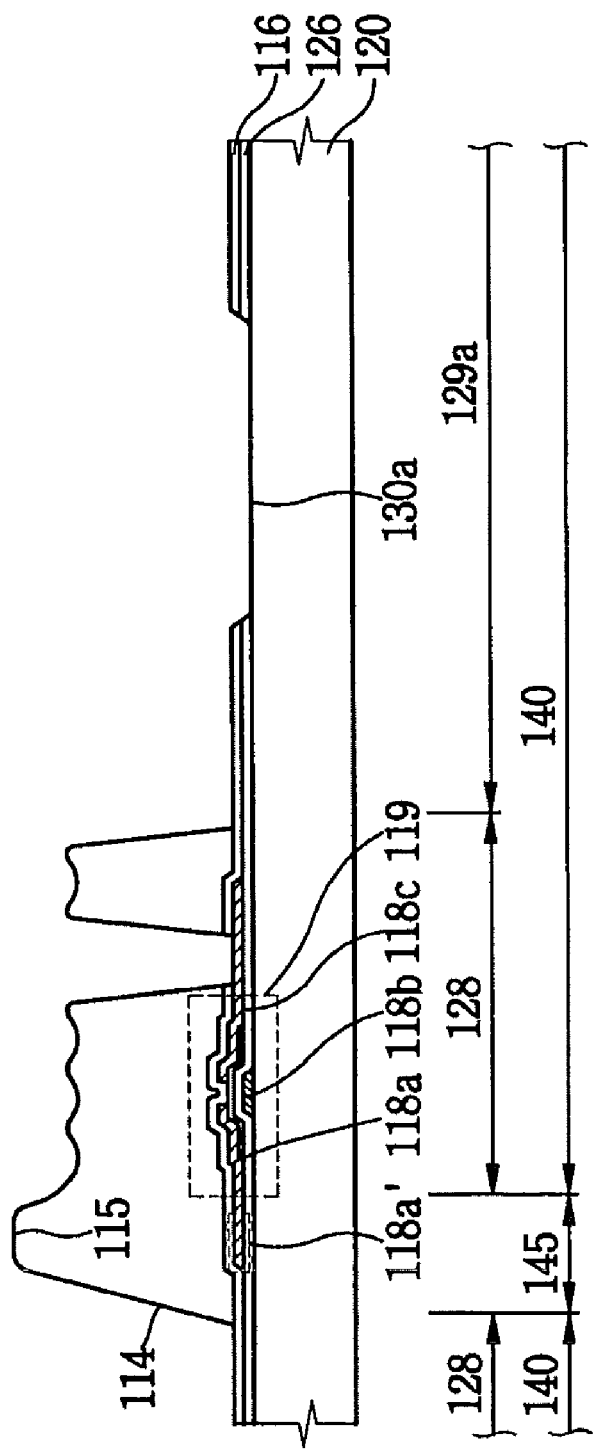

Referring to FIG. 5E, the coated organic material 114' is exposed and developed to form an organic layer 114 including a contact hole, the transmission window 129a, the convex and concave and the protruded portion 115. The drain electrode 118c is partially exposed through the contact hole. The photo process includes exposure and developing steps. The photo process may be performed using one mask or a plurality of the masks. When a single mask is used to form the contact hole, the transmission window 129a, the convex and concave and the protruded portion 115, the mask includes an opaque portion, a translucent portion and the transparent portion. In this exemplary embodiment, the opaque portion corresponds to the protruded portion 115. The translucent portion corresponds to the convex and concave. The transparent portion corresponds to the transmission window 129a. Alternatively, the mask may include a slit.

Figure 5F:
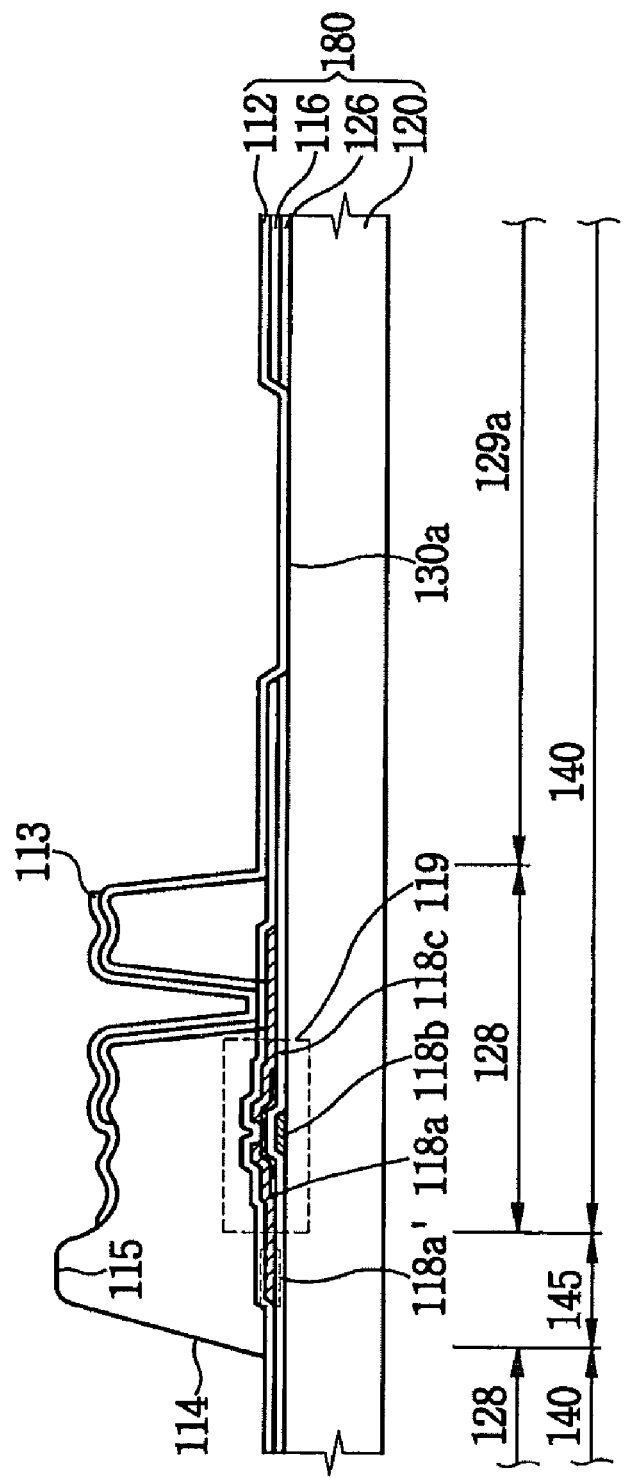

Referring to FIG. 5F, a transparent conductive material is deposited on the organic layer 114, on the passivation layer 116, in the contact hole and in the transmission window 129a. The transparent conductive material includes indium tin oxide (ITO), indium zinc oxide (IZO), zinc oxide (ZO), etc. In this exemplary embodiment, the transparent conductive material includes indium tin oxide (ITO). The deposited transparent conductive material is partially etched to form the transparent electrode 112. The transparent electrode 112 is formed in the pixel region 140.

A conductive material having high reflectivity is then deposited on the lower plate 120 having the organic layer 114. In this exemplary embodiment, the conductive material having the high reflectivity includes aluminum (Al) and neodymium (Nd). The deposited conductivity material having the high reflectivity is partially etched to form the reflection electrode 113 in the reflection region 128.

Alternatively, the reflection electrode 113 may have a multi-layered structure. When the reflection electrode 113 has the multi-layered structure, the reflection electrode 113 includes a molybdenum-tungsten (Mo—W) alloy layer and an aluminum-neodymium (Al—Nd) alloy layer disposed on the molybdenum-tungsten (Mo—W) alloy layer. The reflection electrode 113 is electrically connected to the drain electrode 118c through the transparent electrode 112 and the contact hole.

Alternatively, the transparent electrode 112 may be formed on the transmission window 129a and the inner surface of the opening 130a for the multi-domain, and the reflection electrode 113 is formed on the organic layer 114 and the inner surface of the contact hole so that the transparent electrode 112 is electrically connected to the drain electrode 118c through the reflection electrode 113.

Therefore, the second substrate 180 having the lower plate 120, the TFT 119, the source line 118a', the gate line 118b', the organic layer 114, the transparent electrode 112 and the reflection electrode 113 is completed.

Figure 5G:
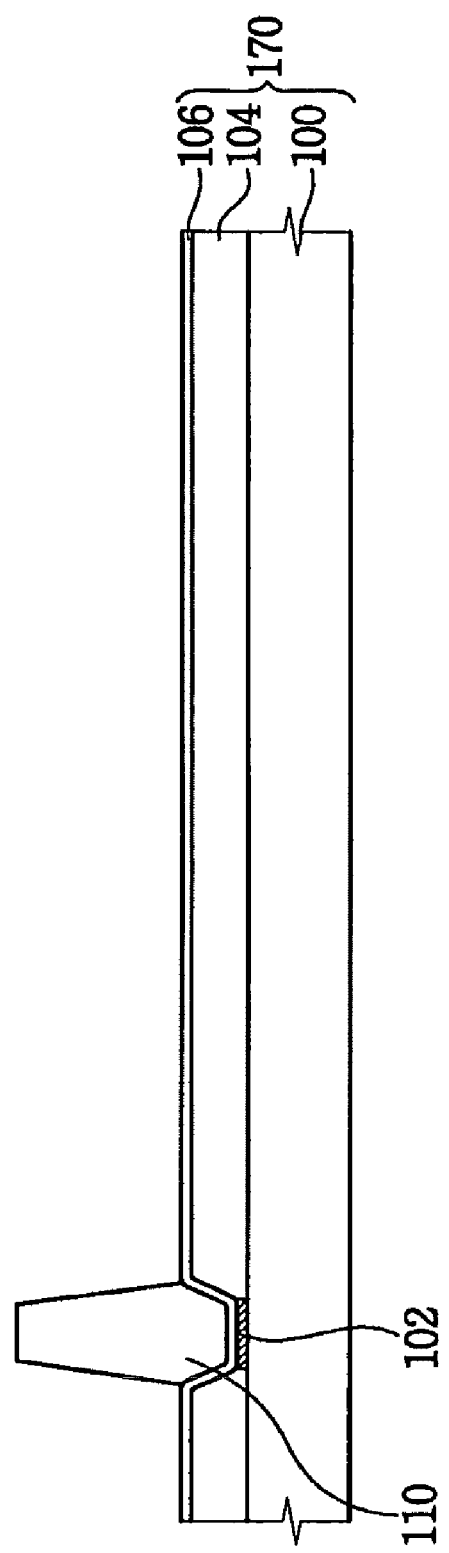

Referring to FIG. 5G, an opaque material is deposited on the upper plate 100. The deposited opaque material is partially removed to form the black matrix 102. Alternatively, the opaque material and photoresist may be coated on the upper plate 100, and the black matrix 102 may then be formed through the photo process. The photo process includes the exposure and developing steps. The black matrix 102 may also be formed on the lower plate 120.

The color filter 104 is formed on the upper plate 100 having the black matrix 102. The light having a predetermined wavelength may pass through the color filter 104. Alternatively, the color filter 104 may also be formed on the lower plate 120. When the color filter 104 is formed on the lower plate 120, the color filter may be formed under the organic layer 114. In this exemplary embodiment, the color filter 104 is formed through the photo process.

A transparent conductive material is deposited on the upper plate 100 having the color filter 104 and the black matrix 102 to form the common electrode 106. The transparent conductive material includes indium tin oxide (ITO), indium zinc oxide (IZO), zinc oxide (ZO), etc.

An organic material is coated on the common electrode 106. In this exemplary embodiment, the organic material includes the photoresist. The coated organic material is exposed and developed to form the spacer 110. The spacer 110 is disposed on the common electrode 106 corresponding to the black matrix 102. Alternatively, a ball spacer may be disposed on the common electrode 106. The spacer 110 may also be disposed on the lower plate 120.

Therefore, the first substrate 170 including the upper plate 100, the black matrix 102, the color filter 104, the common electrode 106 and the spacer 110 is completed.

Figure 5H:
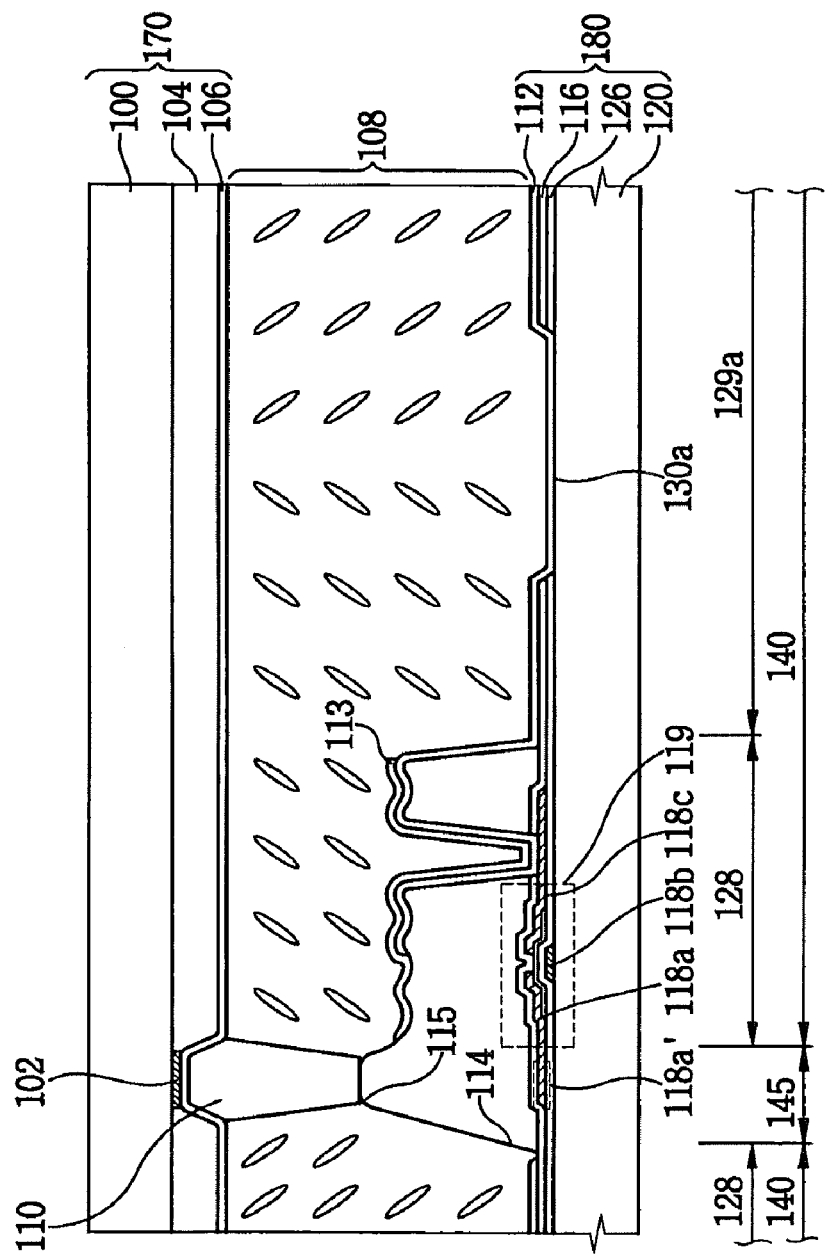

Referring to FIG. 5H, the first substrate 170 is combined with the second substrate 180.

The liquid crystal is injected into a space between the first and second substrates 170 and 180. The injected liquid crystal is sealed by the sealant (not shown) to form the liquid crystal layer 108. Alternatively, the liquid crystal may be dropped on the first substrate 170 or the second substrate 180 having the sealant (not shown) so that the first substrate 170 is combined with the second substrate 180 to form the liquid crystal layer 108.

According to the present embodiment, the arrangement of the vertically aligned liquid crystal disposed in the region adjacent to the protruded portion 115, the stepped portion between the transmission 129a and the reflection region 128 and the opening 130a for the multi-domain is controlled to form the four domains in the transmission window 129a.

Figure 6:
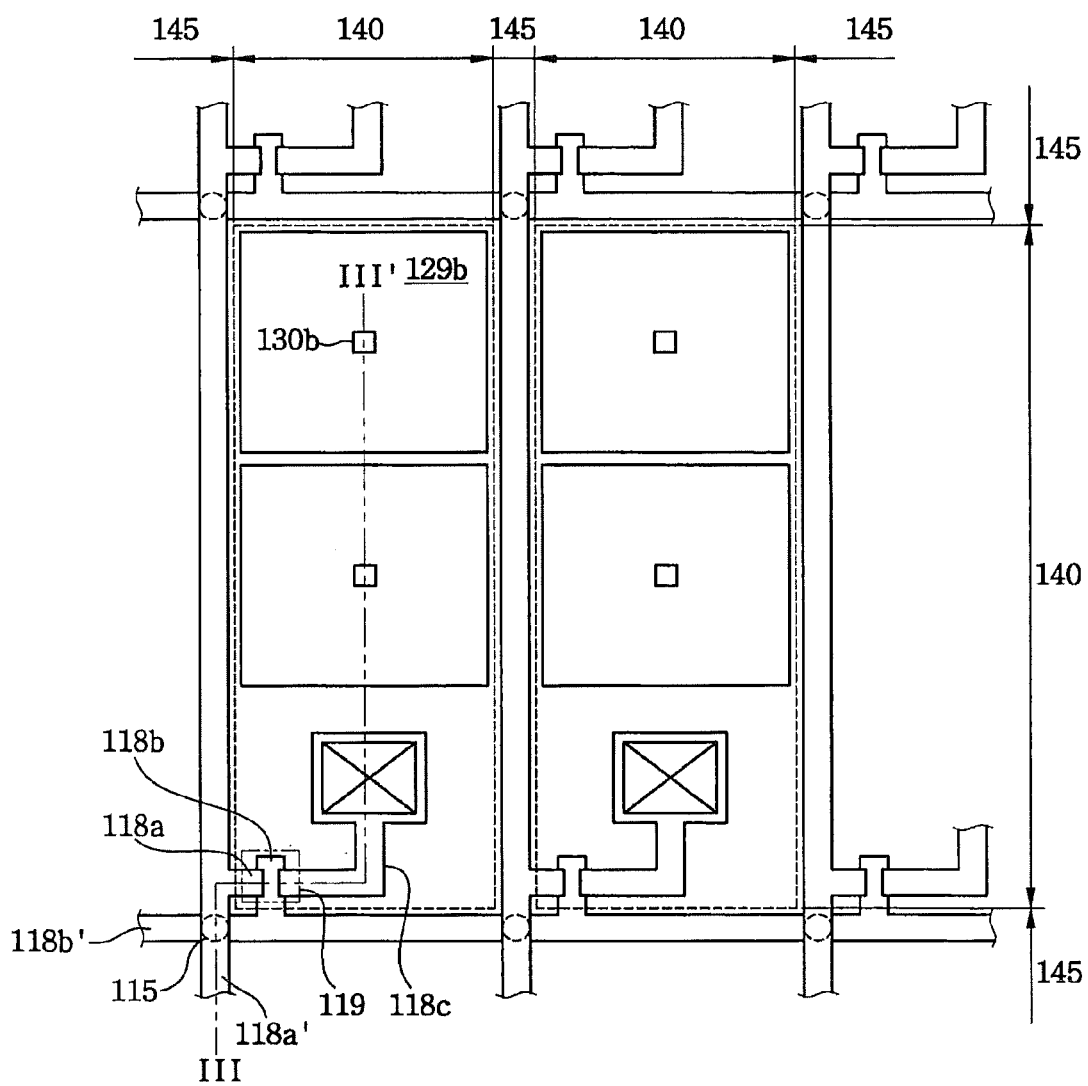
FIG. 6 is a plan view illustrating an LCD apparatus according to another exemplary embodiment of the present invention.
Figure 7:
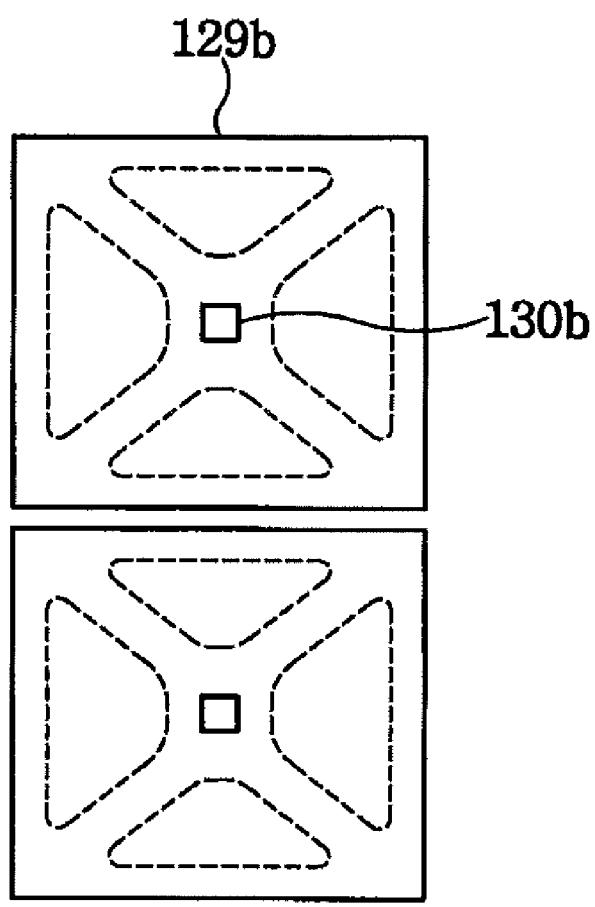
FIG. 7 is a plan view illustrating multi-domains formed in a transmission window shown in FIG. 6.
Figure 8:
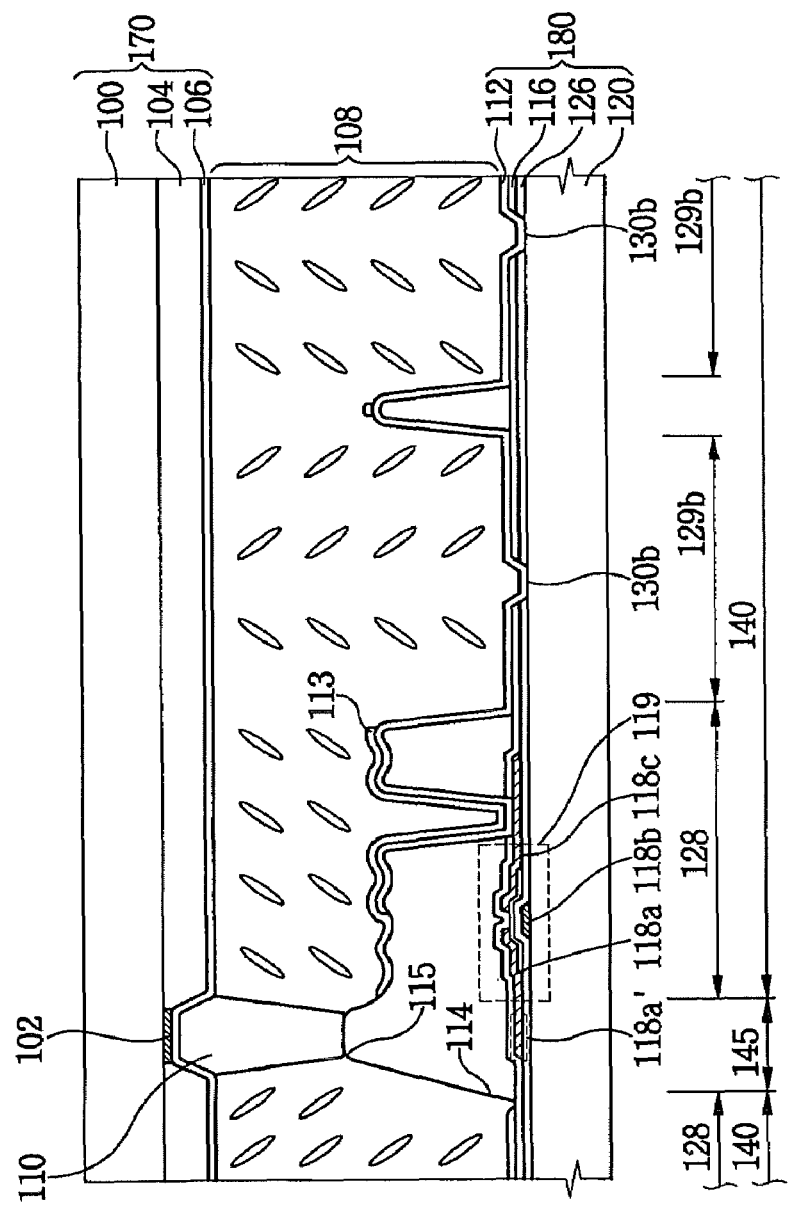
FIG. 8 is a cross-sectional view taken along the III-III' line shown in FIG. 6.

FIG. 6 is a plan view illustrating an LCD apparatus according to another exemplary embodiment of the present invention. FIG. 7 is a plan view illustrating multi-domains formed in a transmission window shown in FIG. 6. FIG. 8 is a cross-sectional view taken along the III-III' line shown in FIG. 6.

The LCD apparatus of FIGS. 6 and 8 is same as in FIGS. 1 to 4 except transmission windows and openings for multi-domains. Thus, the same reference numerals will be used to refer to the same or like parts as those described in FIGS. 1 to 4 and any further explanation will be omitted.

Referring to FIGS. 6 to 8, a second substrate 180 includes a pixel region 140 and a blocking region 145. The pixel region 140 includes two transmission windows 129b and a reflection region 128. In this exemplary embodiment, each of the transmission windows 129b has a rectangular shape. Alternatively, the pixel region 140 may include a plurality of the transmission windows.

A gate insulating layer 126 is disposed over a lower plate 120 having a gate electrode 118b. A passivation layer 116 is disposed over the lower plate 120 having a TFT 119.

The passivation layer 116 includes a contact hole and two openings 130b for multi-domains. A drain electrode 118c is partially exposed through the contact hole. The openings 130b for the multi-domains are disposed in the transmission windows 129b, respectively. In this exemplary embodiment, the openings 130b for the multi-domains are disposed on the central line of the transmission windows 129b, respectively. Each of the openings 130b for the multi-domains has a rectangular shape. A side length of each of the openings 130b for the multi-domains is represented by a reference numeral 'w'. The gate insulating layer 126 corresponding to the openings 130b for the multi-domains is also partially opened.

An organic layer 114 defines the transmission windows 129b that are opened. The organic layer 114 includes a contact hole. The drain electrode 118c is partially exposed through the contact hole.

The transparent electrode 112 is formed on the organic layer 114 corresponding to the pixel region 140, in the contact hole and in the transmission windows 129b. A reflection electrode 113 is disposed on the organic layer 114 corresponding to the reflection region 128 so that a light that is provided from an exterior to the LCD apparatus is reflected from the reflection electrode 113. Alternatively, the reflection electrode 113 may not be formed in a region between the transmission windows 129b.

Referring to FIG. 7, four domains are formed in each of the transmission windows 129b. Each of the openings 130b for the multi-domains is disposed on a center of the four domains. The four domains are disposed adjacent to each of the openings 130c for the multi-domains.

According to the present embodiment, when voltages are applied to the transparent electrode 112, the reflection electrode 113 and the common electrode 106, a distorted electric field is formed in a region adjacent to the protruded portion 115 and the spacer 110, a stepped portion between the transmission window 129b and the reflection region 128, and a region adjacent to each of the openings 130b for the multi-domains. When the distorted electric field is applied to the vertically aligned liquid crystal layer 108, eight domains are formed in the vertically aligned liquid crystal layer 108 so that the viewing angle of the LCD apparatus is improved.

Figure 9:
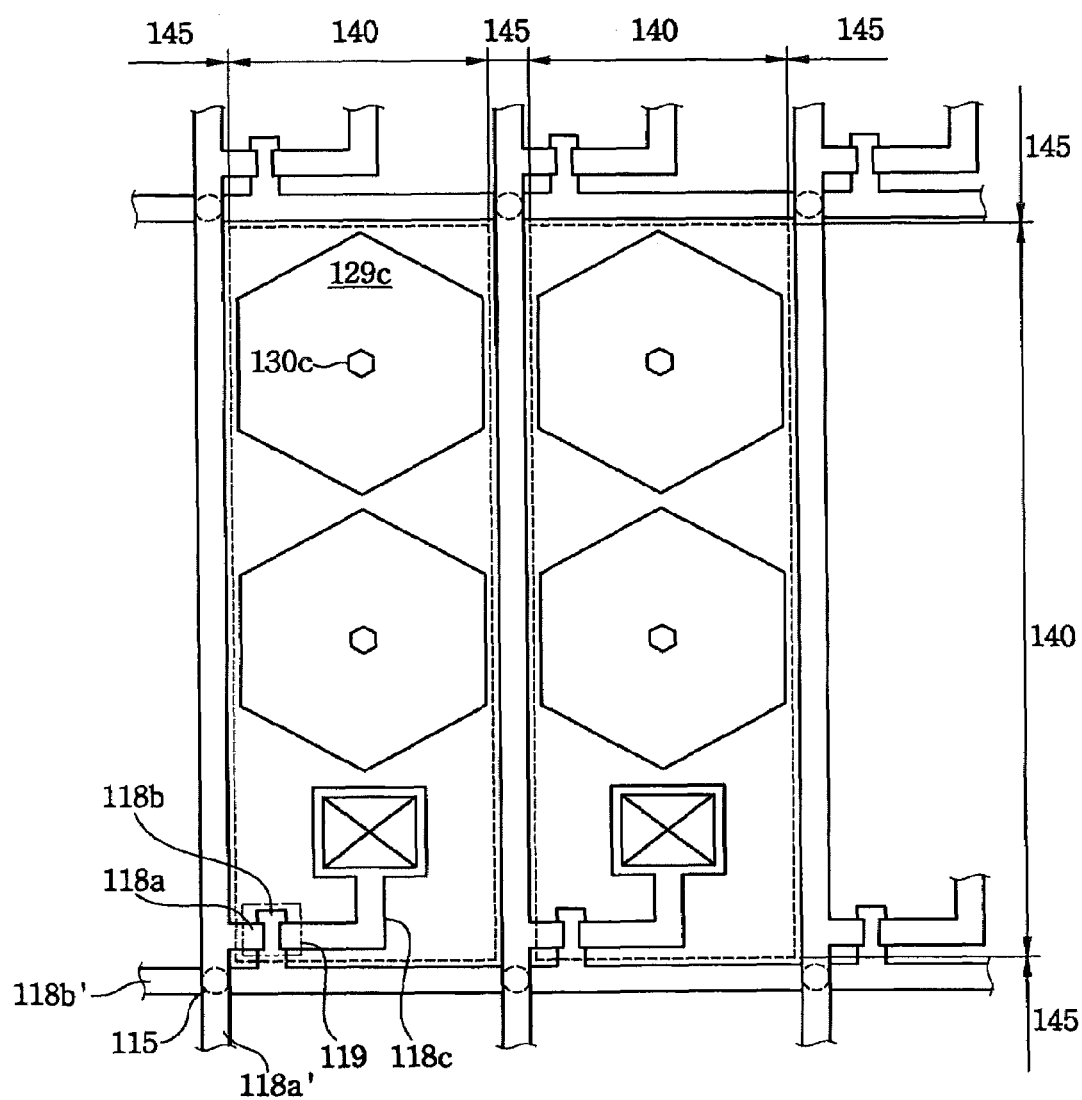
FIG. 9 is a plan view illustrating an LCD apparatus according to another exemplary embodiment of the present invention.

FIG. 9 is a plan view illustrating an LCD apparatus according to another exemplary embodiment of the present invention.

The LCD apparatus of FIG. 9 is same as in FIGS. 6 to 8 except transmission windows and openings for multi-domains. Thus, the same reference numerals will be used to refer to the same or like parts as those described in FIGS. 6 to 8 and any further explanation will be omitted.

Referring to FIGS. 8 and 9, a second substrate 180 includes a pixel region 140 and a blocking region 145. The pixel region 140 includes two transmission windows 129c and a reflection region 128. Each of the transmission windows 129c has a hexagonal shape.

A passivation layer 116 includes a contact hole and two openings 130c for multi-domains. A drain electrode 118c is partially exposed through the contact hole. The openings 130c for the multi-domains are disposed in the transmission windows 129c, respectively. In this exemplary embodiment, the openings 130c for the multi-domains are disposed on the central line of the transmission windows 129c. Each of the openings 130c for the multi-domains has a hexagonal shape.

An organic layer 114 corresponding to the transmission windows 129c is opened, and the organic layer 114 includes a contact hole. The drain electrode 118c is partially exposed through the contact hole.

The transparent electrode 112 is formed on the organic layer 114 corresponding to the pixel region 140, in the contact hole and in the transmission windows 129c. A reflection electrode 113 is disposed on the organic layer 114 corresponding to the reflection region 128 so that a light that is externally provided to LCD apparatus is reflected from the reflection electrode 113.

A plurality of domains is formed in each of the transmission windows 129c. Each of the openings 130c for the multi-domains is disposed on a center of the domains. The domains are disposed adjacent to each of the openings 130c for the multi-domains.

According to the present embodiment, when voltages are applied to the transparent electrode 112, the reflection electrode 113 and the common electrode 106, a distorted electric field is formed in a region adjacent to the protruded portion 115 and the spacer 110, a stepped portion between the transmission window 129c and the reflection region 128, and a region adjacent to each of the openings 130c for the multi-domains. When the distorted electric field is applied to the vertically aligned liquid crystal layer 108, twelve domains are formed in the vertically aligned liquid crystal layer 108 so that the viewing angle of the LCD apparatus is improved.

Figure 10:
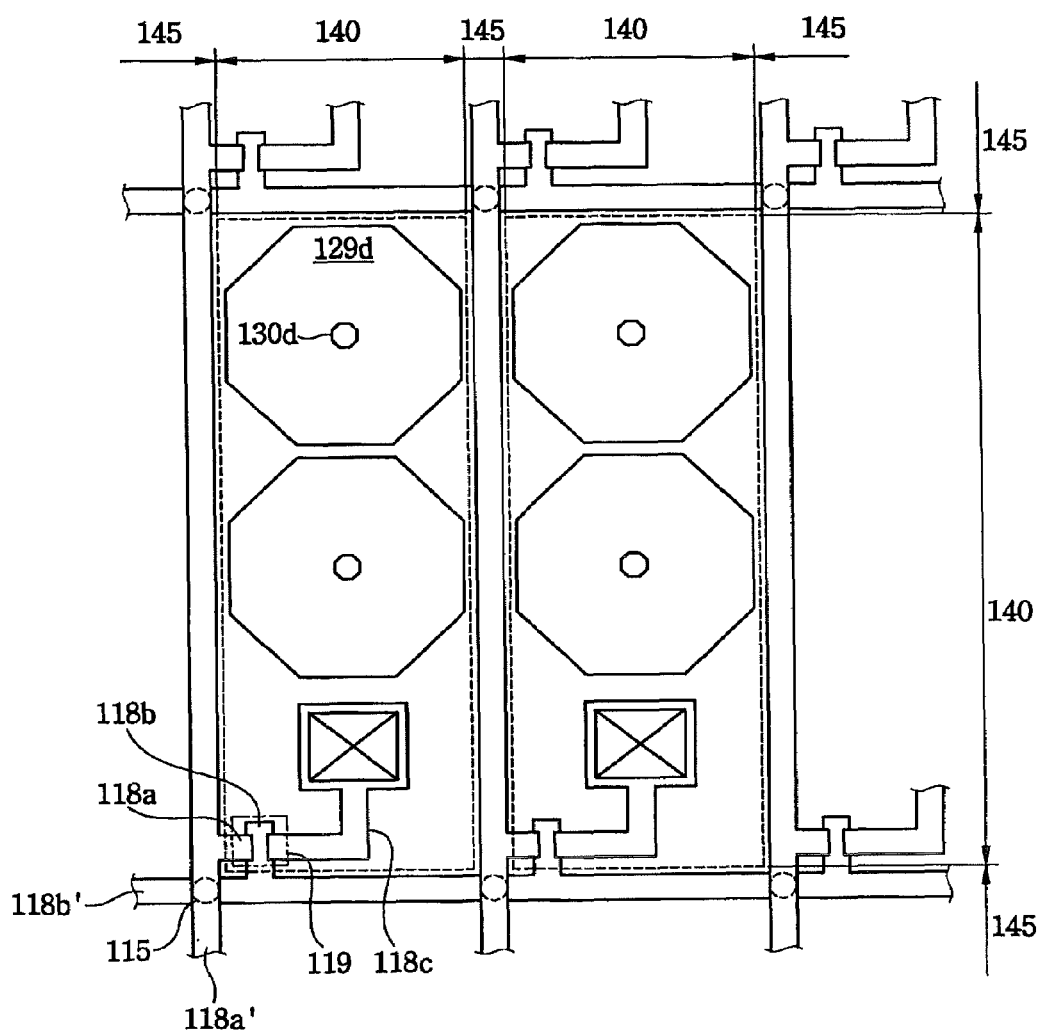
FIG. 10 is a plan view illustrating an LCD apparatus according to another exemplary embodiment of the present invention.

FIG. 10 is a plan view illustrating an LCD apparatus according to another exemplary embodiment of the present invention.

The LCD apparatus of FIG. 10 is same as in FIGS. 6 to 8 except transmission windows and openings for multi-domains. Thus, the same reference numerals will be used to refer to the same or like parts as those described in FIGS. 6 to 8 and any further explanation will be omitted.

Referring to FIGS. 8 and 10, a second substrate 180 includes a pixel region 140 and a blocking region 145. The pixel region 140 includes two transmission windows 129d and a reflection region 128. Each of the transmission windows 129d has an octagonal shape.

A passivation layer 116 includes a contact hole and two openings 130d for multi-domains. A drain electrode 118c is partially exposed through the contact hole. The openings 130d for the multi-domains are disposed in the transmission windows 129d, respectively. In this exemplary embodiment, the openings 130d for the multi-domains are disposed on the central line of the transmission windows 129d. Each of the openings 130d for the multi-domains has a hexagonal shape.

An organic layer 114 defines the transmission windows 129d that is opened, and the organic layer 114 includes a contact hole. The drain electrode 118c is partially exposed through the contact hole.

The transparent electrode 112 is formed on the organic layer 114 corresponding to the pixel region 140, in the contact hole and in the transmission windows 129d. A reflection electrode 113 is disposed on the organic layer 114 corresponding to the reflection region 128 so that a light that is externally provided to the LCD apparatus is reflected from the reflection electrode 113.

A plurality of domains is formed in each of the transmission windows 129d. Each of the openings 130d for the multi-domains is disposed on a center of the domains. The domains are disposed adjacent to each of the openings 130d for the multi-domains.

According to the present embodiment, when voltages are applied to the transparent electrode 112, the reflection electrode 113 and the common electrode 106, a distorted electric field is formed in a region adjacent to the protruded portion 115 and the spacer 110, a stepped portion between the transmission window 129d and the reflection region 128, and a region adjacent to each of the openings 130d for the multi-domains. When the distorted electric field is applied to the vertically aligned liquid crystal layer 108, sixteen domains are formed in the vertically aligned liquid crystal layer 108 so that the viewing angle of the LCD apparatus is improved.

Referring again to FIGS. 6, 9 and 10, when the transmission windows 129b, 129c and 129d are disposed in one pixel region 140, the length of the stepped portion between the transmission windows 129b, 129c and 129d and the organic layer 114 increases so that the alignment of the liquid crystal adjacent to the stepped portion may be disturbed, thereby deteriorating the image display quality.

Figure 11:
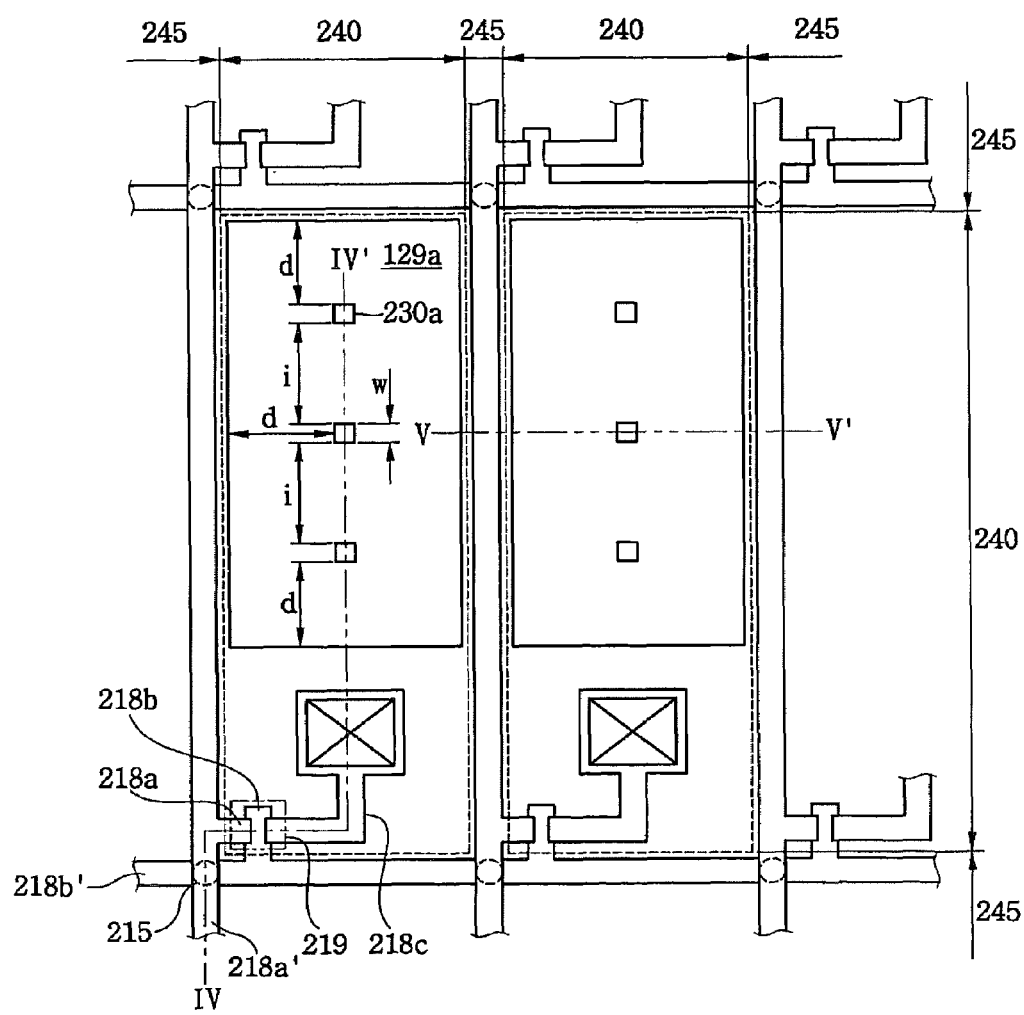
FIG. 11 is a plan view illustrating an LCD apparatus according to another exemplary embodiment of the present invention.
Figure 12:
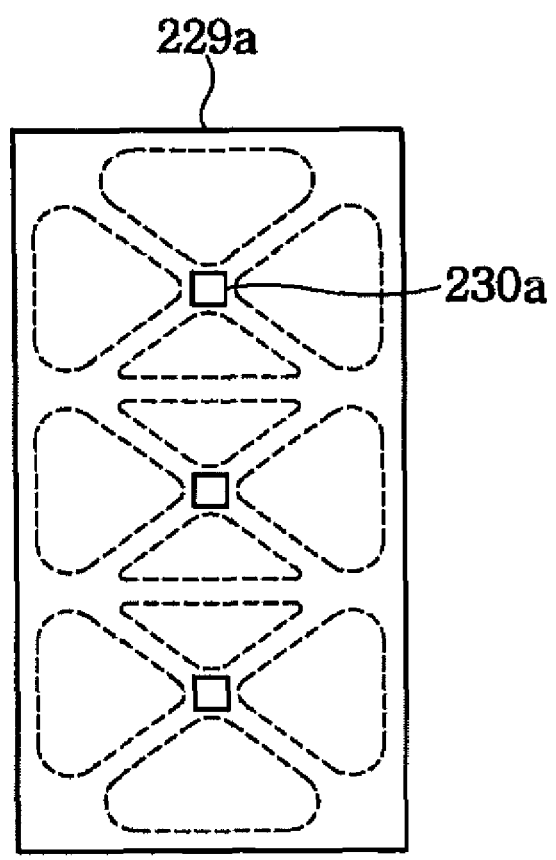
FIG. 12 is a plan view illustrating a multi-domain formed in a transmission window shown in FIG. 11.
Figure 13:
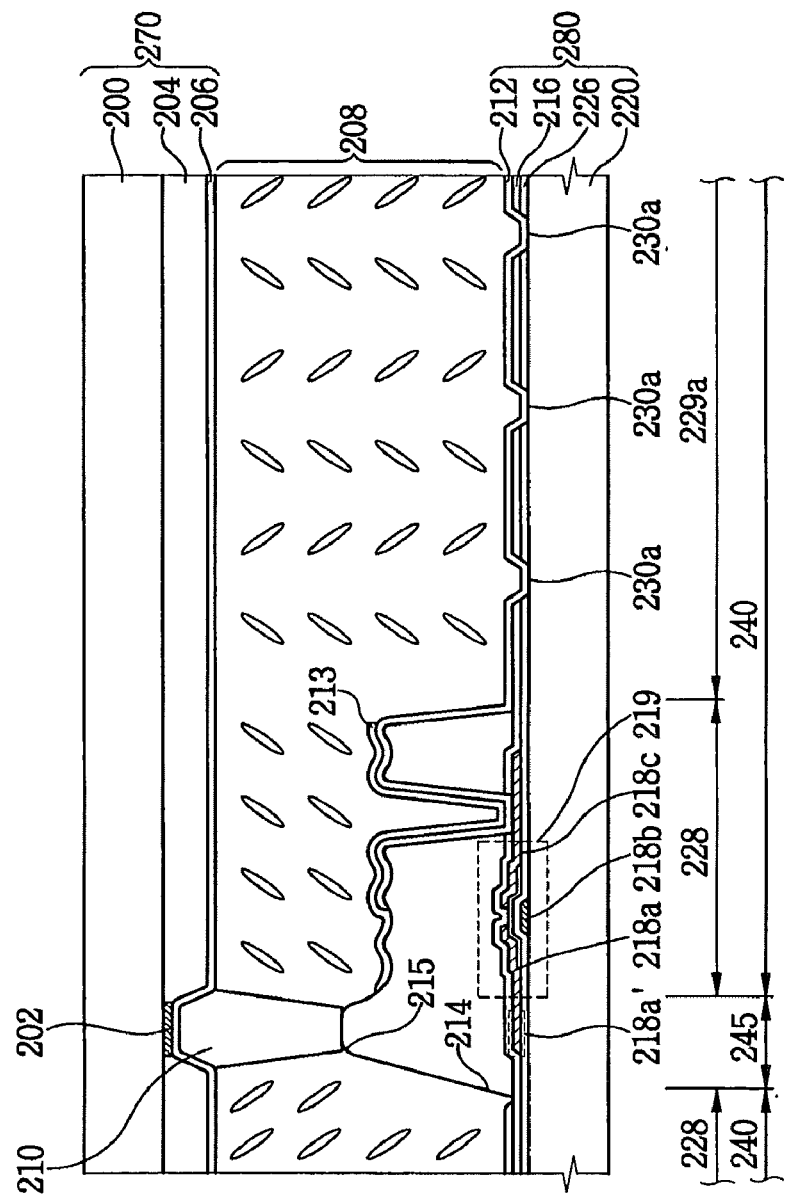
FIG. 13 is a cross-sectional view taken along the IV-IV' line shown in FIG. 11.
Figure 14:
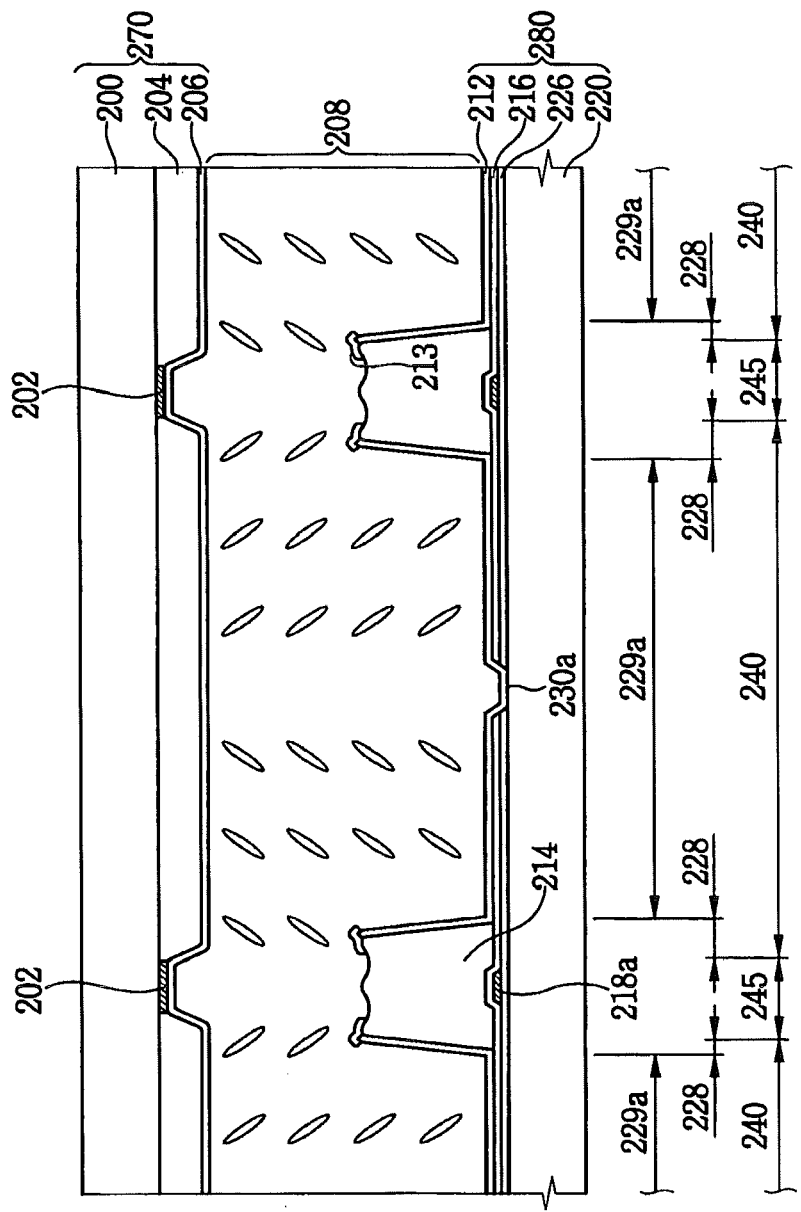
FIG. 14 is a cross-sectional view taken along the V-V' line shown in FIG. 11.

FIG. 11 is a plan view illustrating an LCD apparatus according to another exemplary embodiment of the present invention. FIG. 12 is a plan view illustrating a multi-domain formed in a transmission window shown in FIG. 11. FIG. 13 is a cross-sectional view taken along the IV-IV' line shown in FIG. 11. FIG. 14 is a cross-sectional view taken along the V-V' line shown in FIG. 11.

The LCD apparatus of FIGS. 11 to 14 is same as in FIGS. 1 to 4 except openings for a multi-domain. Thus, the same reference numerals will be used to refer to the same or like parts as those described in FIGS. 1 to 4 and any further explanation will be omitted.

Referring to FIGS. 11 and 14, the LCD apparatus includes a first substrate 270, a second substrate 280 and a liquid crystal layer 208.

The first substrate 270 includes an upper plate 200, a black matrix 202, a color filter 204, a common electrode 206 and a spacer 210. The second substrate 280 includes a lower plate 220, a TFT 219, a source line 218a', a gate line 218b', a gate insulating layer 226, a passivation layer 216, a transparent electrode 212 and a reflection electrode 213. The liquid crystal layer 208 is interposed between the first and second substrates 270 and 280.

The second substrate 280 includes a pixel region 240 and a blocking region 245. An image is displayed in the pixel region 240, and internally and externally provided lights are blocked in the blocking region 245. The pixel region 240 includes a transmission window 229a and a reflection region 228. The internally provided light generated from a backlight assembly passes through the transmission window 229a, and the light that is externally provided to the LCD apparatus is reflected from the reflection region 228. For example, the transmission window 229a may have a rectangular shape extended in a longitudinal direction in substantially parallel with the source line 218a'.

The upper and lower plates 200 and 220 include a transparent glass. The internally and externally provided lights may pass through the transparent glass.

The black matrix 202 is disposed in the reflection region 228 of the upper plate 200 to block the internally and externally provided lights. The black matrix 202 blocks the internally and externally provided lights passing through the blocking region 245 to improve the image display quality. An opaque material comprising photoresist may be coated on the upper substrate 200 to form the black matrix 202 through a photo process.

The color filter 204 is formed on the upper plate 200 having the black matrix 202 so that the internally and externally provided lights having a predetermined wavelength may pass through the color filter 204.

The common electrode 206 is formed on the upper substrate 200 having the black matrix 202 and the color filter 204.

The spacer 210 is formed on the upper substrate 200 having the common electrode 206. The first substrate 270 is spaced apart from the second substrate 280 by the spacer 210.

The TFT 219 is disposed in the reflection region 228 of the lower plate 220, and includes a source electrode 218a, a gate electrode 218b, a drain electrode 218c and a semiconductor layer pattern. A driving integrated circuit (not shown) supplies the source electrode 218a with a data voltage through the source line 218a', and supplies the gate electrode 218b with a gate signal through the gate line 218b'.

The storage capacitor (not shown) is formed on the lower plate 220 to maintain a voltage difference between the reflection electrode 213 and the common electrode 206 and between the transparent electrode 212 and the common electrode 206. The storage capacitor (not shown) may be an end-gate type or an isolated line type.

The gate insulating layer 226 is formed over the lower substrate having the gate electrode 218b so that the gate electrode 218b is electrically insulated from the source electrode 218a and the drain electrode 218c.

The passivation layer 216 is disposed over the lower substrate 220 having the TFT 219, and includes a contact hole. The drain electrode 218c is partially exposed through the contact hole.

The passivation layer 216 includes three openings 230a for a multi-domain to form the multi-domain in the liquid crystal layer 208. The openings 230a for the multi-domain are disposed in the transmission window 229a. In this exemplary embodiment, the openings 230a for the multi-domain are disposed on the central line of the transmission window 229a. Each of the openings 230a for the multi-domain has a rectangular shape. A side length of each of the openings 230a is represented by a reference numeral 'w'. A distance 'd' between a side of one of the openings 230a for the multi-domain and a side of the transmission window 229a adjacent to each other is substantially equal to an interval 'i' between sides of the openings 230a for the multi-domain adjacent to each other. The transmission window 229a includes a first side that is in substantially parallel with the gate line 218b' and a second side that is in substantially perpendicular to the first side.

In this exemplary embodiment, the gate insulating layer 226 corresponding to the openings 230a for the multi-domain is also opened.

The organic layer 214 is disposed on the lower plate 220 having the TFT 219 and the passivation layer 226 so that the TFT 219 is electrically insulated from the transparent electrode 212 and the reflection electrode 213.

The organic layer 214 includes convex and concave disposed on the upper surface of the organic layer 214. The convex and concave improve the reflectivity of the reflection electrode 213. In this exemplary embodiment, the convex and concave improve the reflectivity of the reflection electrode 213 viewed from a front of the liquid crystal display apparatus. A protruded portion 215 is disposed on a portion of the organic layer 214 where the source line 218a' is overlapped with the gate line 218b'.

Referring again to FIG. 12, twelve domains are disposed in the transmission window 229a to form the multi-domain. Four domains of the twelve domains are disposed adjacent to each of the openings 230a for the multi-domain, and a center of the four domains corresponds to the openings 230a for the multi-domain. The four domains are disposed adjacent to the openings 230a for the multi-domain.

The transparent electrode 212 is disposed on the organic layer 214 corresponding to the pixel region 240, in the contact hole and in the transmission window 229a so that the transparent electrode 212 is electrically connected to the drain electrode 218c.

The reflection electrode 213 is disposed on the organic layer 214 corresponding to the reflection region 228.

A first alignment layer (not shown) and a second alignment layer (not shown) are disposed on the first and second substrates 270 and 280, respectively. The first and second alignment layers (not shown) are rubbed in predetermined directions.

The liquid crystal layer 208 is interposed between the first and second substrates 270 and 280, and sealed by the sealant (not shown). The liquid crystal layer 208 is vertically aligned.

When the voltages are applied to the transparent electrode 212, the reflection electrode 213 and the common electrode 206, a distorted electric field is formed in a region adjacent to the protruded portion 215 and the spacer 210, a stepped portion between the transmission window 229a and the reflection region 228, and a region adjacent to each of the openings 230a for the multi-domain. When the distorted electric field is applied to the vertically aligned liquid crystal layer 208, the multi-domain is formed in the vertically aligned liquid crystal layer 208 so that a viewing angle of the LCD apparatus is improved.

In addition, a plurality of the openings 130a for the multi-domain is disposed in one transmission window 229a so that the length of the stepped portion between the transmission window 229a and the reflection region 229 is decreased, thereby improving the image display quality.

Furthermore, a distance 'd' is substantially equal to an interval 'i' so that the domains having different shapes are formed, thereby increasing the viewing angle of the LCD apparatus.

Figure 15:
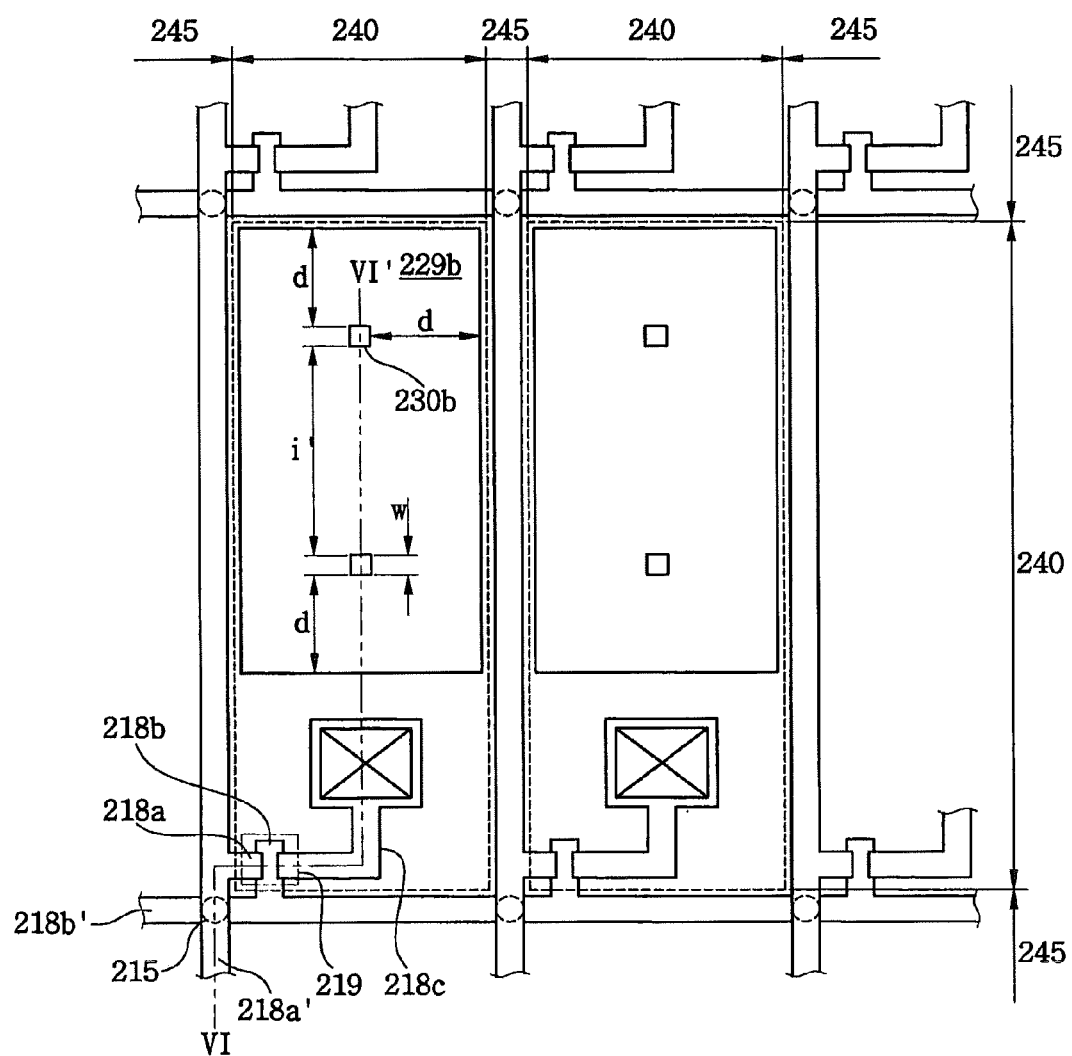
FIG. 15 is a plan view illustrating an LCD apparatus according to an exemplary embodiment of the present invention.
Figure 16:
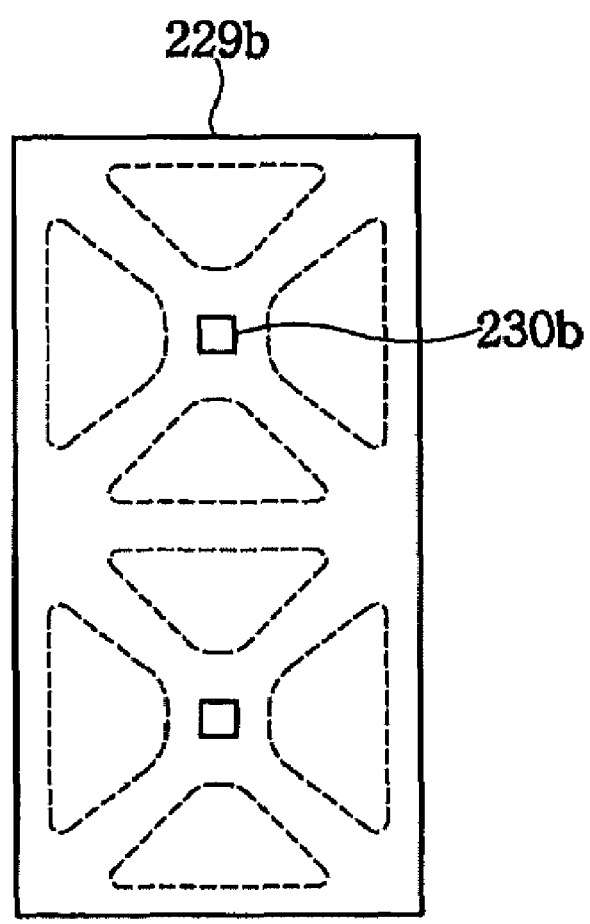
FIG. 16 is a plan view illustrating a multi-domain formed in a transmission window shown in FIG. 15.
Figure 17:
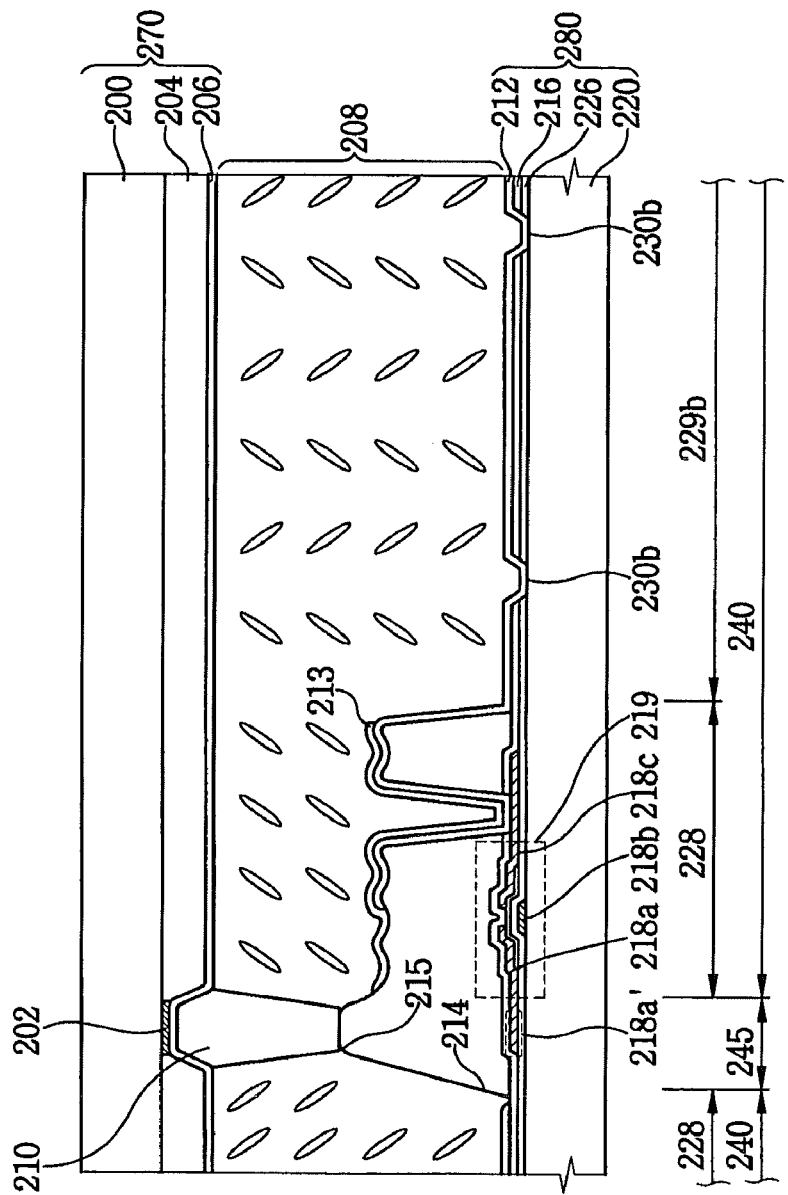
FIG. 17 is a cross-sectional view taken along the VI-VI' line shown in FIG. 16.

FIG. 15 is a plan view illustrating an LCD apparatus according to an exemplary embodiment of the present invention. FIG. 16 is a plan view illustrating a multi-domain formed in a transmission window shown in FIG. 15. FIG. 17 is a cross-sectional view taken along the VI-VI' line shown in FIG. 16.

The LCD apparatus of FIGS. 15 to 17 is same as in FIGS. 1 to 4 except openings for a multi-domain. Thus, the same reference numerals will be used to refer to the same or like parts as those described in FIGS. 1 to 4 and any further explanation will be omitted.

Referring to FIGS. 15 and 17, the LCD apparatus includes a first substrate 270, a second substrate 280 and a liquid crystal layer 208.

The second substrate 280 includes a lower plate 220, a TFT 219, a source line 218a', a gate line 218b', a gate insulating layer 226, a passivation layer 216, a transparent electrode 212 and a reflection electrode 213.

The second substrate 280 includes a pixel region 240 and a blocking region 245. An image is displayed in the pixel region 240, and internally and externally provided lights are blocked in the blocking region 245. The pixel region 240 includes a transmission window 229b and a reflection region 228. For example, the transmission window 229b may have a rectangular shape extended in a longitudinal direction in substantially parallel with the source line 218a'.

The passivation layer 216 is disposed over the lower substrate 220 having the TFT 219, and includes a contact hole. The drain electrode 218c is partially exposed through the contact hole.

The passivation layer 216 includes two openings 230b for a multi-domain to form the multi-domain in the liquid crystal layer 208. The openings 230b for the multi-domain are disposed in the transmission window 229b. In this exemplary embodiment, the openings 230b for the multi-domain are disposed on the central line of the transmission window 229b. Each of the openings 230b for the multi-domain has a rectangular shape. A side length of each of the openings 230b for the multi-domain is represented by a reference numeral 'w'. A distance 'd' between a side of one of the openings 230b for the multi-domain and a side of the transmission window 229b adjacent to each other is about a half of an interval 'i' between sides of the openings 230b for the multi-domain adjacent to each other.

In this exemplary embodiment, the gate insulating layer 226 corresponding to the openings 230b for the multi-domain is also opened.

Referring again to FIG. 16, eight domains are disposed in the transmission window 229b to form the multi-domain. Four domains of the eight domains are disposed adjacent to each of the openings 230b for the multi-domain, and a center of the four domains corresponds to the openings 230b for the multi-domain. The four domains are disposed adjacent to the openings 230b for the multi-domain.

When the voltages are applied to the transparent electrode 212, the reflection electrode 213 and the common electrode 206, a distorted electric field is formed in a region adjacent to each of the openings 230b for the multi-domain. When the distorted electric field is applied to the vertically aligned liquid crystal layer 208, the multi-domain is formed in the vertically aligned liquid crystal layer 208 so that the viewing angle of the LCD apparatus is improved.

In addition, a plurality of the openings 230b for the multi-domain is disposed in one transmission window 229b so that the length of the stepped portion between the transmission window 229b and the reflection region 229 is decreased, thereby improving the image display quality.

Furthermore, the distance 'd' is about a half of the interval 'i' so that the domains have substantially identical shapes to one another.

Figure 18:
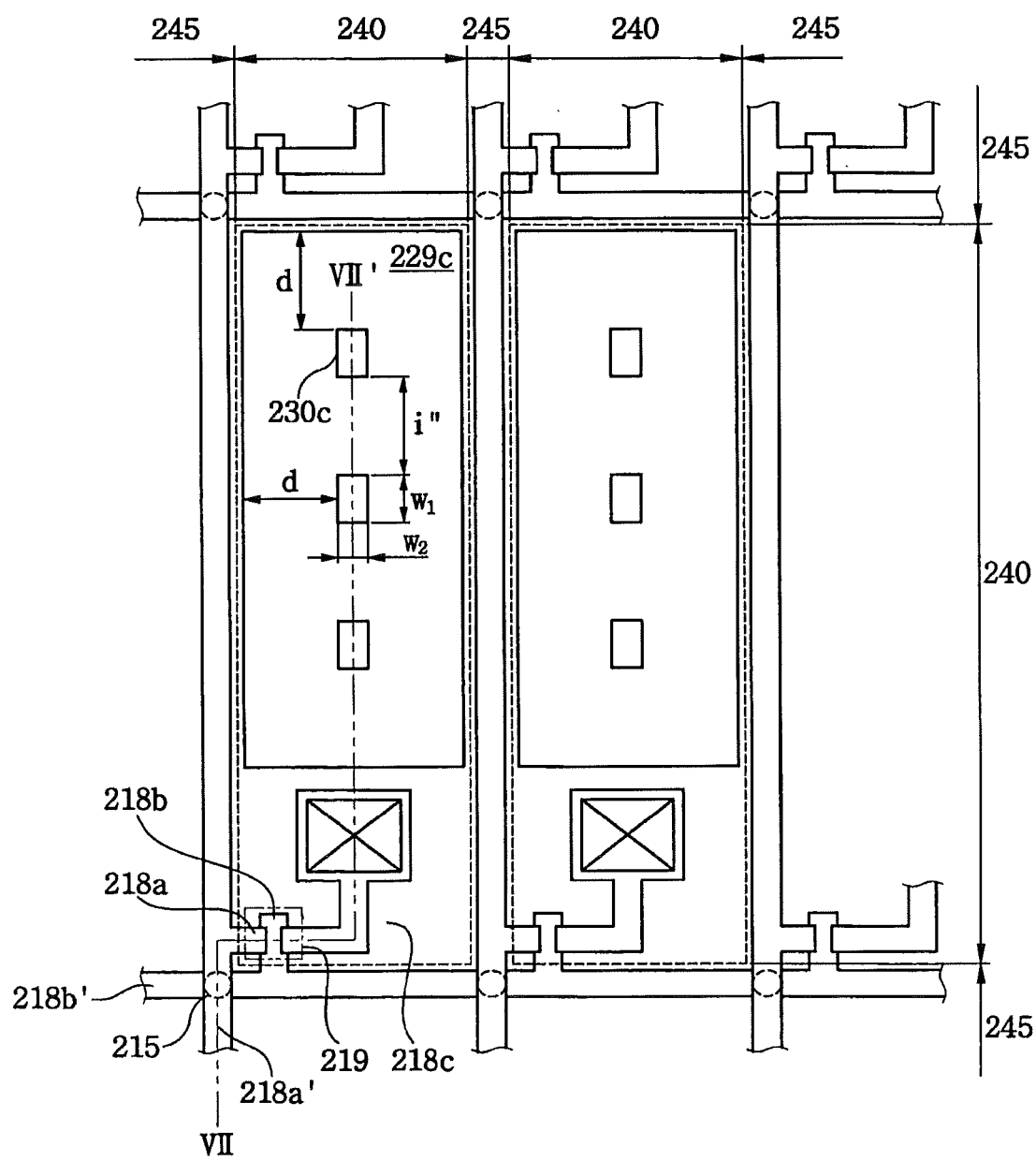
FIG. 18 is a plan view illustrating an LCD apparatus according to an exemplary embodiment of the present invention.
Figure 19:
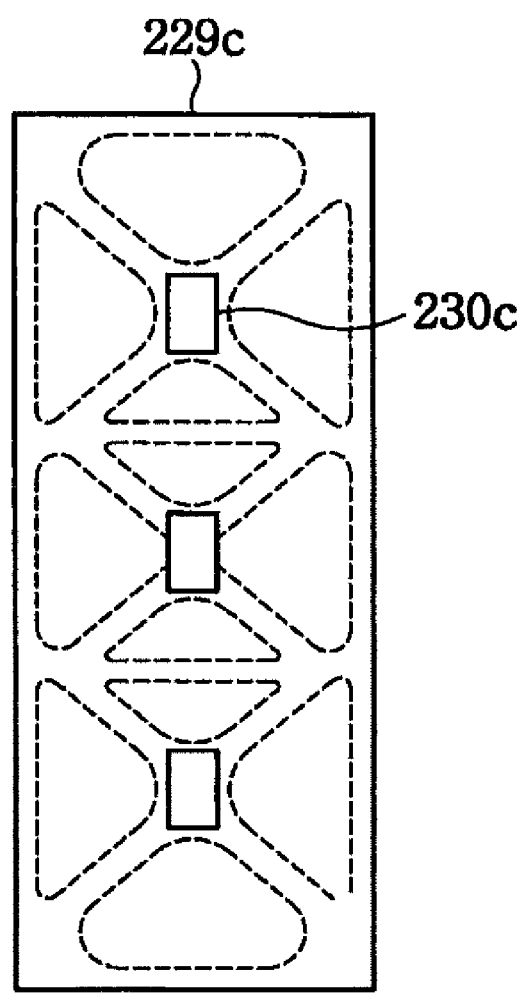
FIG. 19 is a plan view illustrating a multi-domain formed in a transmission window shown in FIG. 18.
Figure 20:
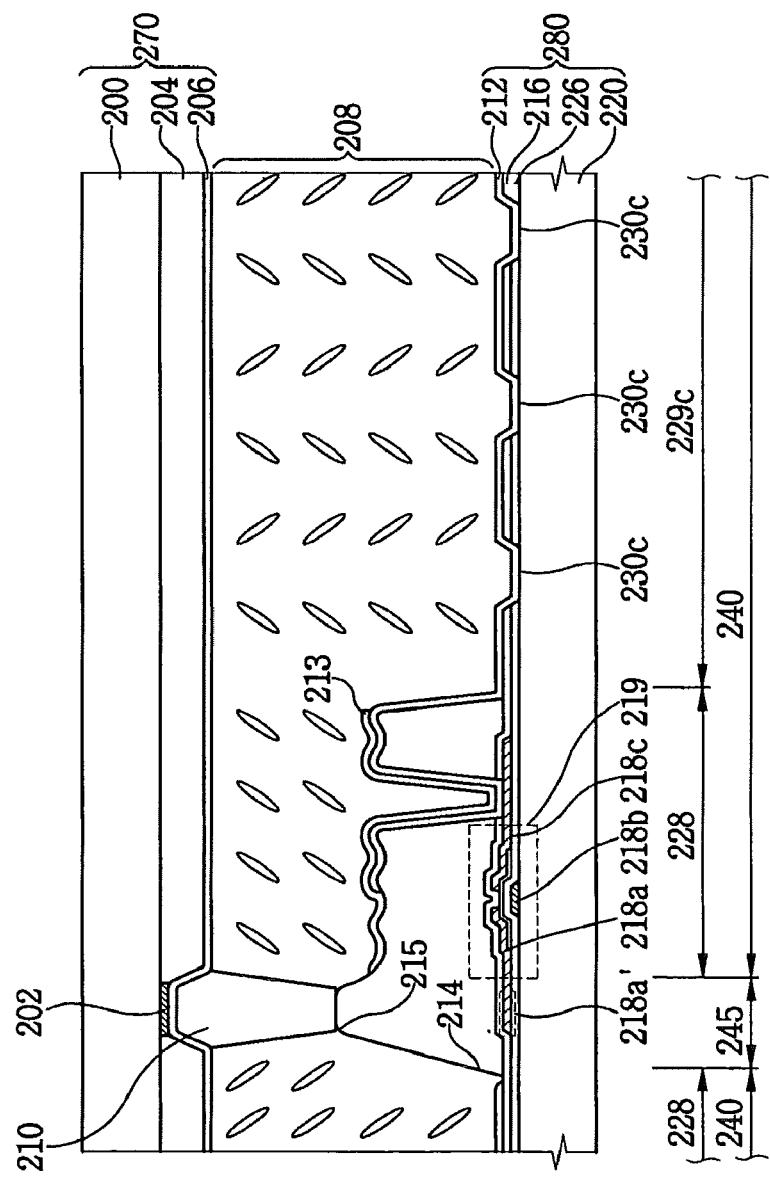
FIG. 20 is a cross-sectional view taken along the VII-VII' line shown in FIG. 18.

FIG. 18 is a plan view illustrating an LCD apparatus according to an exemplary embodiment of the present invention. FIG. 19 is a plan view illustrating a multi-domain formed in a transmission window shown in FIG. 18. FIG. 20 is a cross-sectional view taken along the line VII-VII' shown in FIG. 18.

The LCD apparatus of FIGS. 18 to 20 is same as in FIGS. 1 to 4 except openings for a multi-domain. Thus, the same reference numerals will be used to refer to the same or like parts as those described in FIGS. 1 to 4 and any further explanation will be omitted.

Referring to FIGS. 18 to 20, the transmission window 229c has a rectangular shape that is extended in a longitudinal direction in substantially parallel with a source line 218a'.

A passivation layer 216 is disposed over a lower substrate 220 having a TFT 219, and includes a contact hole. A drain electrode 218c is partially exposed through the contact hole.

The passivation layer 216 includes three openings 230c for a multi-domain to form the multi-domain in the liquid crystal layer 208. The openings 230c for the multi-domain are disposed in the transmission window 229c. The openings 230c for the multi-domain are arranged in substantially parallel with a central line of the transmission window 229c. Each of the openings 230c for the multi-domain has an extended rectangular shape that is extended in the longitudinal direction. A side length of each of the openings 230c for the multi-domain in the longitudinal direction in substantially parallel with the source line 218a' is represented by a reference numeral 'w1', and a side length of each of the openings 230c in a horizontal direction in substantially parallel with the gate line 218b' is represented by a reference numeral 'w2'. A distance 'd' between a side of one of the openings 230c for the multi-domain and a side of the transmission window 229c adjacent to each other is substantially identical to an interval 'I''' between sides of the openings 230c for the multi-domain adjacent to each other.

In this exemplary embodiment, each of the openings 230c for the multi-domain has a substantially identical shape to the transmission window 229c.

When three openings 230c for the multi-domain are disposed in the transmission window 229c, and each of the openings 230c for the multi-domain has a substantially identical shape to the transmission window 229c, the longitudinal length and the horizontal length of the transmission window 229c are represented by '2d+2i''+3w1' and '2d+w2'.

Equation 1 represents the ratio of the longitudinal length 2d+2i''+3w1 of the transmission window 229c to the horizontal length 2d+w2 of the transmission window 229c and the ratio of the longitudinal side length w1 of each of the openings 230c for the multi-domain to the horizontal side length w2 of each of the openings 230c for the multi-domain.

Equation 1

$$d=i'', 2d+2i''+3w1:2d+w2=w1:w2 \quad \text{Equation 1}$$

When the longitudinal length 2d+2i''+3w1 of the transmission window 229c and the horizontal length 2d+w2 of the transmission window 229c are about 210 μm and about 70 μm, respectively, the longitudinal side length w1 of each of the openings 230c for the multi-domain and the horizontal side length w2 of each of the openings 230c for the multi-domain are about 30 μm and about 10 μm, respectively.

Alternatively, the transmission window 229c may also include a plurality of the openings 230c for the multi-domain. When the number of the openings 230c in one transmission window 229c is 'n', the longitudinal length and the horizontal length of the transmission window 229c are represented by '2d+(n−1)i''+3w1' and '2d+w2', respectively.

Equation 2 represents the ratio of the longitudinal length 2d+(n−1)i''+3w1 of the transmission window 229c to the horizontal length 2d+w2 of the transmission window 229c and the ratio of the longitudinal side length w1 of each of the openings 230c to the horizontal side length w2 of each of the openings 230c.

Equation 2.

$$d=i'', 2d+(n-1)i''+3w1:2d+w2=w1:w2 \quad \text{Equation 2}$$

In this exemplary embodiment, the gate insulating layer 226 corresponding to the openings 230c for the multi-domain is also opened.

Referring again to FIG. 19, twelve domains are disposed in the transmission window 229c to form the multi-domain. Four domains of the twelve domains are disposed adjacent to each of the openings 230c for the multi-domain, and a center of the four domains corresponds to the openings 230c for the multi-domain. The four domains are disposed adjacent to the openings 230c for the multi-domain. The domains disposed upper/lower portions of the openings 230c for the multi-domain are horizontally extended, and the domains disposed left/right portions of the openings 230c for the multi-domain are longitudinally extended.

When the voltages are applied to the transparent electrode 212, the reflection electrode 213 and the common electrode 206, a distorted electric field is formed in a region adjacent to each of the openings 230c for the multi-domain. When the distorted electric field is applied to the vertically aligned liquid crystal layer 208, the multi-domain is formed in the vertically aligned liquid crystal layer 208 so that the viewing angle of the LCD apparatus is improved.

In addition, each of the openings 230c for the multi-domain has a substantially identical shape to the transmission window 229c so that the domains have various shapes.

Figure 21:
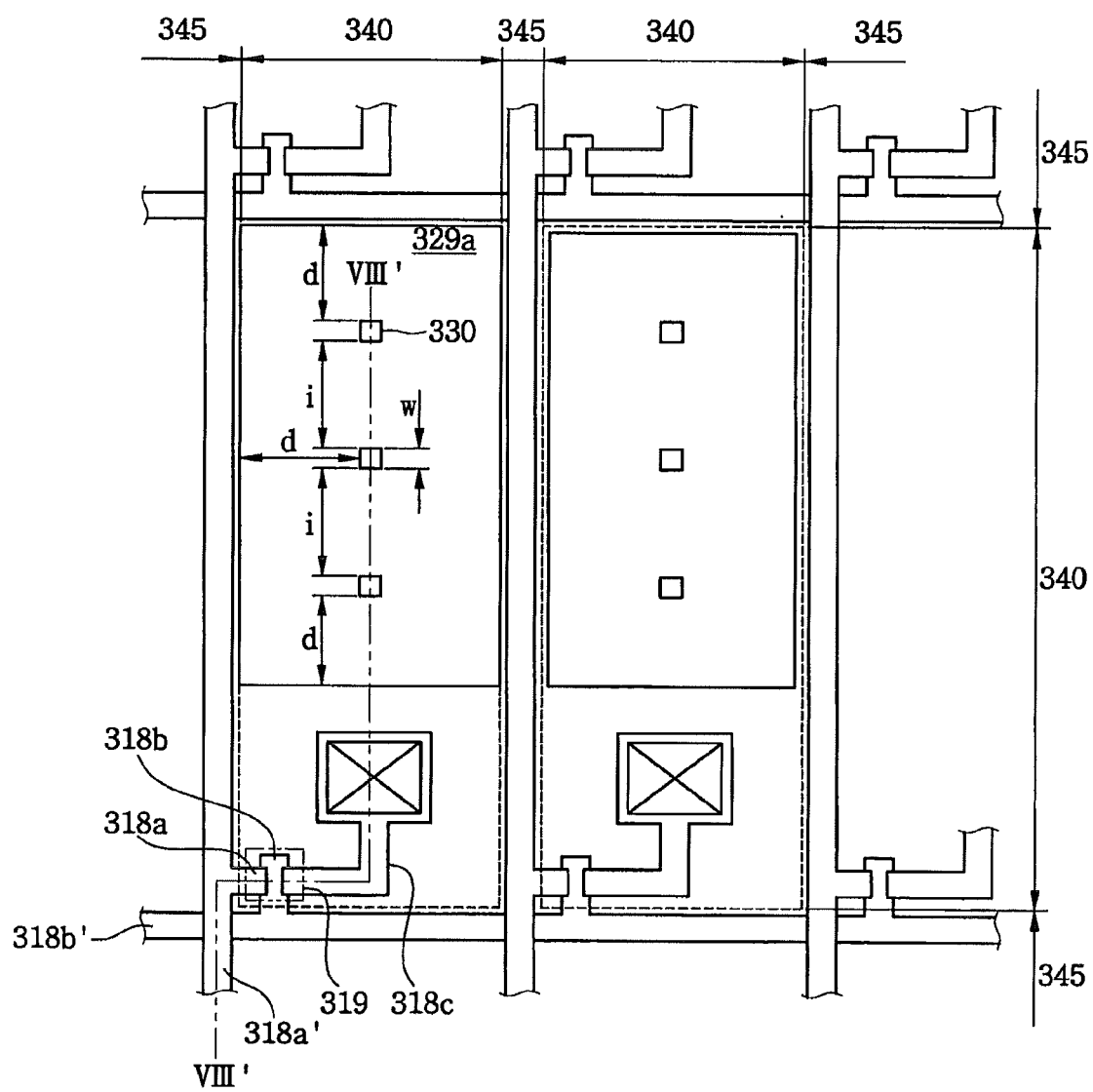
FIG. 21 is a plan view illustrating an LCD apparatus according to another exemplary embodiment of the present invention.
Figure 22:
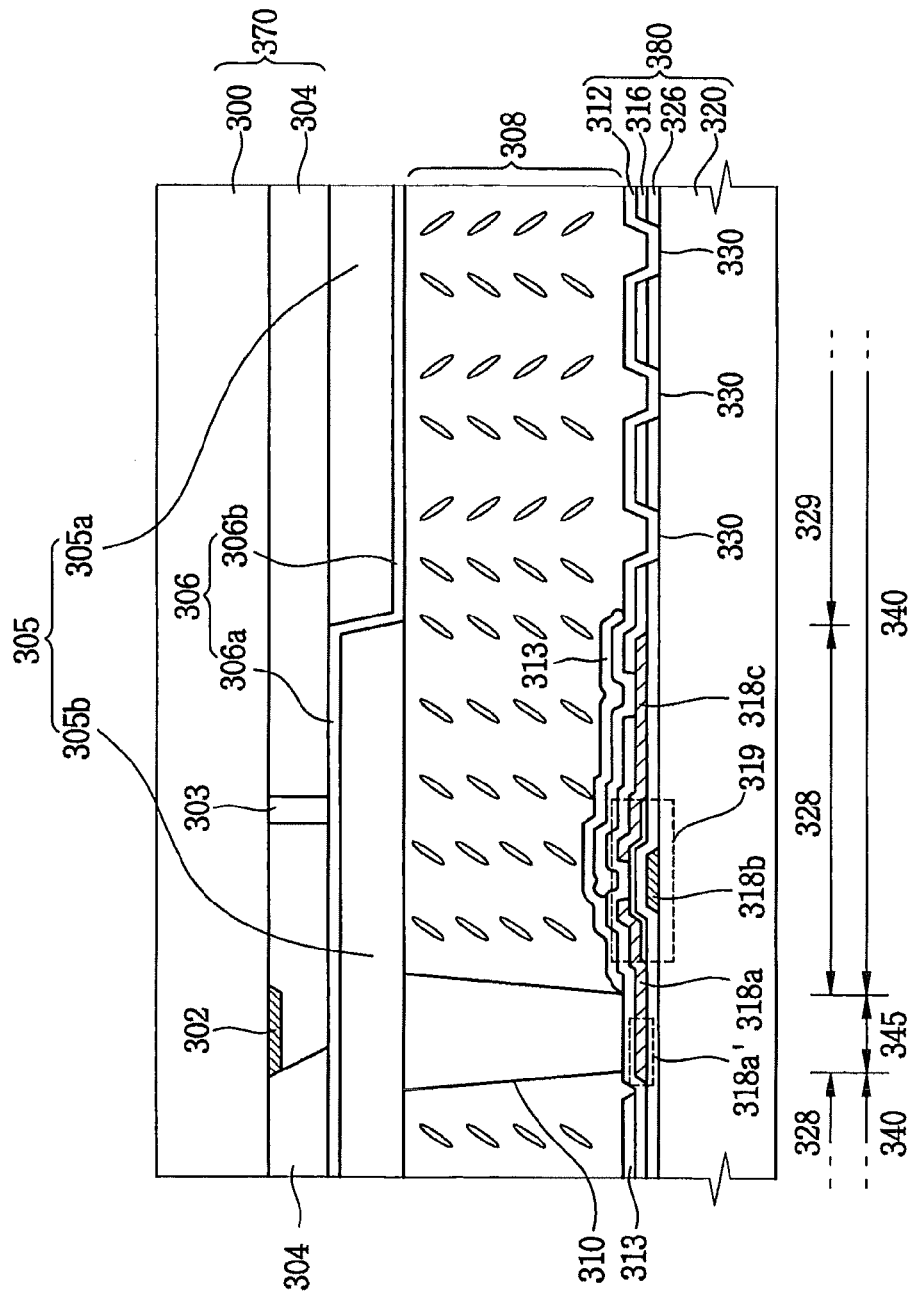
FIG. 22 is a cross-sectional view taken along the VIII-VIII' line shown in FIG. 21.

FIG. 21 is a plan view illustrating an LCD apparatus according to another exemplary embodiment of the present invention. FIG. 22 is a cross-sectional view taken along the line VIII-VIII' shown in FIG. 21.

The LCD apparatus of FIGS. 21 and 22 is same as in FIGS. 1 to 4 except openings for a multi-domain. Thus, the same reference numerals will be used to refer to the same or like parts as those described in FIGS. 1 to 4 and any further explanation will be omitted.

Referring to FIGS. 21 and 22, the LCD apparatus includes a first substrate 370, a second substrate 380 and a liquid crystal layer 308.

The first substrate 370 includes an upper plate 300, a black matrix 302, a color filter 304, an overcoating layer 305, a common electrode 306 and a spacer 310.

The second substrate 380 includes a lower plate 320, a TFT 319, a gate insulating layer 326, a passivation layer 316, a transparent electrode 312 and a reflection electrode 313. The second substrate 380 further includes a pixel region 340 and a blocking region 345.

The pixel region 340 includes a reflection region 349 and a transmission window 329. The light that is externally provided to the LCD apparatus is reflected from the reflection region 349, and the internally provided light generated from a backlight assembly (not shown) passes through the transmission window 329.

The TFT 319 and the reflection electrode 313 are disposed in the reflection region 328, and the transmission electrode 312 is disposed in the transmission window 329.

The blocking region 345 is disposed adjacent to the pixel region 340. A source line 318a', a gate line 318b', a driving integrated circuit (not shown), etc., are disposed in the blocking region 345.

The black matrix 302 is disposed on the upper plate 300 corresponding to the blocking region 345.

The color filter 304 is formed on the upper plate 300 so that the internally and externally provided light having a predetermined wavelength may pass through the color filter 304. The color filter 304 includes a slit 303 disposed at a position corresponding to the reflection electrode 313.

The overcoating layer 305 that includes a first overcoating portion 305a and a second overcoating portion 305b and the common electrode 306 are alternately disposed on the upper plate 300 having the black matrix 302 and the color filter 304. The common electrode 306b corresponding to the transmission window 329 is disposed on the first overcoating portion 305a that is disposed on the color filter 304. The common electrode 306a corresponding to the blocking region 345 and the reflection region 328 is disposed between the color filter 304 and the second overcoating portion 305b.

A height of the common electrode 306b corresponding to the transmission window 329 is different from that of the common electrode 306a corresponding to the blocking region 345 and the reflection region 328 so that the intensity of the electric field formed in the liquid crystal layer 308 corresponding to the transmission window 329 is different from that of the electric field formed in the liquid crystal layer 308 corresponding to the reflection region 328, although a cell-gap of the liquid crystal layer 308 corresponding to the reflection region 328 is substantially equal to a cell-gap of the liquid crystal layer 308 corresponding to the transmission window 329.

The overcoating layer 305 protects the color filter 304 from impurities, particles, etc., and planarizes the stepped portion formed by the black matrix 302 and the color filter 304.

The spacer 310 is formed on the upper plate 300 having the black matrix 302, the color filter 304, the overcoating layer 305 and the common electrode 306.

The TFT 319 is disposed on the lower plate 320, and includes a source electrode 318a, a gate electrode 318b, a drain electrode 318c and a semiconductor layer pattern.

A storage capacitor (not shown) is disposed on the lower plate 320 to maintain the voltage difference between the common electrode 306 and the reflection electrode 313 and between the common electrode 306 and the transparent electrode 312.

The gate insulating layer 326 is disposed over the lower plate 320 having the gate electrode 318b so that the gate electrode 318b is electrically insulated from the source electrode 318a and the drain electrode 318c.

The passivation layer 316 is disposed over the lower plate 320 having the TFT 319, and includes a contact hole. The drain electrode 318c is partially exposed through the contact hole.

The passivation layer 316 and the gate insulating layer 326 include three openings 330 for a multi-domain. The openings 330 for the multi-domain form the multi-domain in the liquid crystal layer 308. The openings 330 for the multi-domain are disposed on the central line of the transmission window 329. Each of the openings 330 for the multi-domain has a rectangular shape. A side length of each of the openings 330 for the multi-domain is represented by a reference numeral 'w'. A distance 'd' between a side of one of the openings 330 for the multi-domain and a side of the transmission window 329 adjacent to each other is substantially equal to an interval 'i' between sides of the openings 330 for the multi-domain adjacent to each other.

The transparent electrode 312 is formed on the passivation layer 316 and the inner surface of the contact hole that partially exposes the passivation layer 316 so that the transparent electrode 312 is electrically connected to the drain electrode 318c.

The reflection electrode 313 is disposed on the passivation layer 316 and a portion of the transparent electrode 312 so that the externally provided light is reflected from the reflection electrode 313.

The liquid crystal layer 308 is interposed between the first and second substrates 370 and 380 so that the liquid crystal layer 308 is sealed by a sealant (not shown).

A first alignment layer (not shown) and a second alignment layer (not shown) are disposed on the first and second substrates 370 and 380, respectively, to align the liquid crystal layer 308. The first and second alignment layers (not shown) may be rubbed in predetermined directions, respectively.

According to the present embodiment, the height of the common electrode 306b corresponding to the transmission window 329 is different from the height of the common electrode 306a corresponding to the blocking region 345 and the reflection region 328 so that the optical characteristics of the liquid crystal layer 308 corresponding to the reflection region 328 and the liquid crystal layer 308 corresponding to the transmission window 329 are optimized.

According to the present invention, the insulating layer includes the openings for the multi-domain so that the viewing angle and the image display quality of the LCD apparatus are improved.

Also, the openings for the multi-domain are disposed on the second substrate to form the multi-domain having improved characteristics, although the first substrate is misaligned with the second substrate. For example, the domains in the multi-domain may have substantially identical shapes or different shapes.

Furthermore, the openings for the multi-domain are formed from a same layer as the contact hole so that the manufacturing process is simplified and the manufacturing cost is decreased.

In addition, a plurality of the openings of the multi-domain may be formed in one transmission window so that the length of the stepped portion adjacent to a side of the transmission window is decreased, thereby improving the image display quality of the LCD apparatus.

Furthermore, the height of the common electrode corresponding to the transmission window may be different from the height of the common electrode corresponding to the blocking region and the reflection region so that the optical characteristics of the liquid crystal layer are optimized.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A method of manufacturing an array substrate, the method comprising:

forming a switching element on a plate including a pixel region;

forming an inorganic insulating layer on the plate, the inorganic insulating layer including an opening for a multi-domain disposed in the pixel region and a contact hole through which an electrode of the switching element is partially exposed;

forming an organic layer on the inorganic layer; and forming a pixel electrode on the inorganic insulating layer, an inner surface of the opening for the multi-domain and an inner surface of the contact hole so that the pixel electrode is electrically connected to the electrode of the switching element, and has a first portion formed on the organic layer, a second portion directly formed on the inorganic insulating layer and a third portion formed in the opening.

2. The method of claim 1, wherein the pixel electrode is formed by:

forming a transparent electrode on the organic layer, the inorganic insulating layer corresponding to the pixel region, the inner surface of the opening for the multi-domain and the inner surface of the contact hole; and forming a reflection electrode in a reflection region of the pixel region, an externally provided light being reflected from the reflection electrode, wherein the organic layer includes a protruded portion for the multi-domain on the inorganic insulating layer to define a transmission window that is opened.

3. The method of claim 1, wherein the pixel electrode is formed by:

forming a transparent electrode on the inorganic insulating layer, the organic layer corresponding to the pixel region, the inner surface of the opening for the multi-domain and the inner surface of the contact hole; and forming a reflection electrode in a reflection region of the pixel region, an externally provided light being reflected from the reflection electrode, wherein the organic layer includes the contact hole and a protruded portion for the multi-domain on the inorganic insulating layer to define a transmission window that is opened.

4. A method of manufacturing an array substrate, the method comprising:
   forming an inorganic insulating layer on a plate including a pixel region having a transmission window through which an internally provided light passes, the inorganic insulating layer including a plurality of openings for a multi-domain disposed in the transmission window and a contact hole through which an electrode of a switching element is partially exposed;
   forming an organic layer on the inorganic insulating layer; and
   forming a pixel electrode on the organic layer, the inorganic insulating layer, an inner surface of the openings for the multi-domain and an inner surface of the contact hole so that the pixel electrode is electrically connected to the electrode of the switching element, and has a first portion formed on the organic layer, a second portion directly formed on the inorganic insulating layer and a third portion formed in the opening.

5. The method of claim 4, further comprising:
   forming a gate electrode on the plate;
   forming a gate insulating layer on the plate having the gate electrode;
   forming a semiconductor layer on the gate insulating layer corresponding to the gate insulating layer; and
   forming a source electrode and a drain electrode that is spaced apart from the source electrode on the semiconductor layer.

6. The method of claim 5, wherein the inorganic insulating layer is formed by:
   depositing a transparent insulating material on the plate having the switching element; and
   etching the deposited transparent insulating material and the gate insulating layer to form the openings for the multi-domain and the contact hole.

7. The method of claim 5, wherein the inorganic insulating layer is formed by:
   depositing a transparent insulating material on the plate having the switching element; and
   etching the deposited transparent insulating material to form the openings for the multi-domain and the contact hole.

8. The method of claim 7, further comprising forming the organic layer including a protruded portion for the multi-domain on the inorganic insulating layer, the organic layer defining the transmission window that is opened.

9. The method of claim 8, wherein the pixel electrode is formed by:
   forming a transparent electrode on the organic layer corresponding to the pixel region, the inner surface of the openings for the multi-domain and the inner surface of the contact hole; and
   forming a reflection electrode in a reflection region of the pixel region, an externally provided light being reflected from the reflection electrode.

10. The method of claim 8, wherein the pixel electrode is formed by:
    forming a transparent electrode on the organic layer, the inorganic insulating layer corresponding to the pixel region, the inner surface of the opening for the multi-domain and the inner surface of the contact hole; and
    forming a reflection electrode in a reflection region of the pixel region, an externally provided light being reflected from the reflection electrode.

* * * * *